(12) United States Patent
Nien et al.

(10) Patent No.: US 12,219,129 B2
(45) Date of Patent: Feb. 4, 2025

(54) DEVICE AND METHOD FOR DECODING VIDEO DATA

(71) Applicant: SHARP KABUSHIKI KAISHA, Sakai (JP)

(72) Inventors: Yu-Chieh Nien, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/092,565

(22) Filed: Jan. 3, 2023

(65) Prior Publication Data

US 2023/0217013 A1 Jul. 6, 2023

Related U.S. Application Data

(60) Provisional application No. 63/266,402, filed on Jan. 4, 2022.

(51) Int. Cl.
| | |
|---|---|
| *H04N 19/105* | (2014.01) |
| *H04N 19/159* | (2014.01) |
| *H04N 19/176* | (2014.01) |

(52) U.S. Cl.
CPC ......... *H04N 19/105* (2014.11); *H04N 19/159* (2014.11); *H04N 19/176* (2014.11)

(58) Field of Classification Search
CPC ... H04N 19/105; H04N 19/159; H04N 19/176
USPC .................................................... 375/240.12
See application file for complete search history.

(56) References Cited

U.S. PATENT DOCUMENTS

| | | | |
|---|---|---|---|
| 10,511,852 B1 | 12/2019 | Xu et al. | |
| 10,701,393 B2 | 6/2020 | Chen et al. | |
| 2009/0180538 A1* | 7/2009 | Visharam | H04N 19/176 |
| | | | 375/240.15 |
| 2017/0099495 A1* | 4/2017 | Rapaka | H04N 19/523 |
| 2020/0007864 A1* | 1/2020 | Li | H04N 19/139 |
| 2020/0068218 A1* | 2/2020 | Chen | H04N 19/82 |
| 2020/0084453 A1* | 3/2020 | Xu | H04N 19/52 |
| 2020/0105025 A1* | 4/2020 | Yea | G06T 15/08 |
| 2020/0107043 A1* | 4/2020 | Hung | H04N 19/56 |
| 2020/0162743 A1* | 5/2020 | Park | H04N 19/513 |

(Continued)

FOREIGN PATENT DOCUMENTS

CN 110574377 A 12/2019

*Primary Examiner* — Matthew David Kim
(74) *Attorney, Agent, or Firm* — ScienBiziP, P.C.

(57) ABSTRACT

A method of decoding video data by an electronic device is provided. The electronic device determines at least one block vector predictor for a block unit determined from a current frame according to the video data. The electronic device determines, from the current frame, a block template region adjacent to the block unit and a plurality of candidate template regions each indicated by a specific one of the at least one block vector predictor and a corresponding one of block vector differences in a vector difference list. The electronic device determines a first cost value between the block template region and each of the candidate template regions and determines, based on the first cost values, an adjusted difference list including at least one of the block vector differences. The electronic device selects, based on the adjusted difference list, a reference block from the current frame for reconstructing the block unit.

20 Claims, 8 Drawing Sheets

(56) References Cited

U.S. PATENT DOCUMENTS

| | | | |
|---|---|---|---|
| 2021/0392356 A1* | 12/2021 | Chujoh | H04N 19/44 |
| 2023/0051108 A1* | 2/2023 | Zhang | H04N 19/52 |
| 2023/0075788 A1* | 3/2023 | Li | H04N 19/70 |
| 2023/0094825 A1* | 3/2023 | Zhang | H04N 19/52 |
| | | | 375/240.02 |

* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/266,402, filed on Jan. 4, 2022, entitled "MOTION VECTOR DIFFERENCE SIGN PREDICTION," the content of which is hereby fully incorporated by reference into the present disclosure.

FIELD

The present disclosure is generally related to video coding and, more specifically, to techniques for using template predictions in intra block copy (IBC).

BACKGROUND

Intra block copy (IBC) merge mode and IBC advanced motion vector prediction (AMVP) are coding tools for video coding. In the IBC merge mode of a conventional video coding method, an encoder and a decoder may determine, in a current image, neighboring candidate IBC-coded blocks for generating an IBC merge list including a plurality of block vector candidates for predicting a target block in the current image. The IBC merge list may also include the block vector candidates determined according to the information stored in a history-based buffer. The encoder may select one of the block vector candidates and predict the target block to generate a residual block, and the decoder may determine the selected block vector candidates and the residual block for reconstructing the target block.

In addition, in IBC AMVP, the encoder and the decoder may also determine, in the current image, the neighboring candidate IBC coded blocks for generating an IBC candidate list including a plurality of block vector candidates and further determine a block vector difference for predicting the target block in the current image based on the selected block vector candidate and the block vector difference. The block vector difference is selected from a reference region determined based on the selected block vector candidate. The encoder may select one of the block vector candidates and the block vector difference and predict the target block to generate the residual block, and the decoder may determine the selected block vector candidates, the block vector difference, and the residual block for reconstructing the target block.

However, the order of the block vector candidates in the IBC merge list and the order of the block vector candidates in the IBC candidate list are predefined without adjusting based on any neighboring information. Since the number of bits for the last one of the block vector candidates is greater than the number of bits for the first one of the block vector candidates, the number of bits will increase if the last one of the block vector candidates for each block in video data is always selected. Thus, the coding efficiency may decrease.

Furthermore, the order of the block vector differences for the IBC merge mode with vector difference (IBC MMVD) and the order of the block vector differences in IBC AMVP are also predefined. Since the number of bits for the last one of the block vector differences is greater than the number of bits for the first one of the block vector differences, the number of bits will increase if the last one of the block vector differences for each block in video data is always selected. Thus, the coding efficiency may decrease.

Therefore, the encoder and the decoder may need an IBC merge list derivation, an IBC candidate list derivation, and an IBC vector difference list derivation for predicting or reconstructing the target block more precisely.

SUMMARY

The present disclosure is directed to a device and method for predicting and reconstructing a block unit in an image frame by using template predictions in IBC.

In a first aspect of the present disclosure, a method of decoding video data and an electronic device for performing the method are provided. The method includes receiving the video data; determining a block unit from a current frame according to the video data; determining at least one block vector predictor for the block unit; determining, from the current frame, a block template region adjacent to the block unit and determining, from the current frame, a plurality of candidate template regions, wherein: each of the plurality of candidate template regions is indicated by a specific one of the at least one block vector predictor and a corresponding one of a plurality of block vector differences, and the plurality of block vector differences is included in a vector difference list; determining a first cost value between the block template region and each of the plurality of candidate template regions; determining, based on the first cost values, an adjusted difference list of the block unit including at least one of the plurality of block vector differences; and selecting, based on the adjusted difference list, a reference block from the current frame for reconstructing the block unit.

An implementation of the first aspect further includes determining, from the current frame, a plurality of block copy candidates; determining, from the current frame, a plurality of copy template regions each adjacent to one of the plurality of block copy candidates; determining a second cost value between the block template region and each of the plurality of copy template regions; and selecting at least one merge block candidate from the plurality of block copy candidates based on the second cost values for determining the at least one block vector predictor.

In an implementation of the first aspect, each of the at least one block vector predictor indicates a corresponding one of at least one intra block predictor from the block unit; a plurality of difference block candidates is indicated by the plurality of block vector differences and the specific one of the at least one block vector predictor; and each of the plurality of candidate template regions is adjacent to one of the plurality of difference block candidates.

An implementation of the first aspect further includes determining an arrangement of the plurality of block vector differences based on the first cost values; and determining the adjusted difference list based on the arrangement.

In an implementation of the first aspect, a first K of the plurality of block vector differences ordered based on the arrangement are selected to add into the adjusted difference list, and K, being an integer equal to or greater than one, is equal to a number of the at least one of the plurality of block vector differences included in the adjusted difference list.

In an implementation of the first aspect, the plurality of block vector differences is ordered in an ascending order of the first cost values to generate the arrangement.

In an implementation of the first aspect, a specific one of the plurality of block vector differences is selected for the block unit, based on a prediction index included in the video data, from the adjusted difference list to reconstruct the block unit; and the block unit is reconstructed based on the specific one of the plurality of block vector differences and the specific one of the at least one block vector predictor without a fractional interpolation.

In an implementation of the first aspect, each of the plurality of block vector differences includes one of a plurality of vector difference directions and at least one of a plurality of vector difference magnitudes.

In an implementation of the first aspect, the plurality of vector difference magnitudes is included in a predefined magnitude table and the plurality of vector difference directions is included in a predefined direction table, and the at least one of the plurality of vector difference magnitudes is selected from the predefined magnitude table based on at least one magnitude index included in the video data.

In an implementation of the first aspect, the specific one of the at least one block vector predictor is selected based on a predictor index included in the video data.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
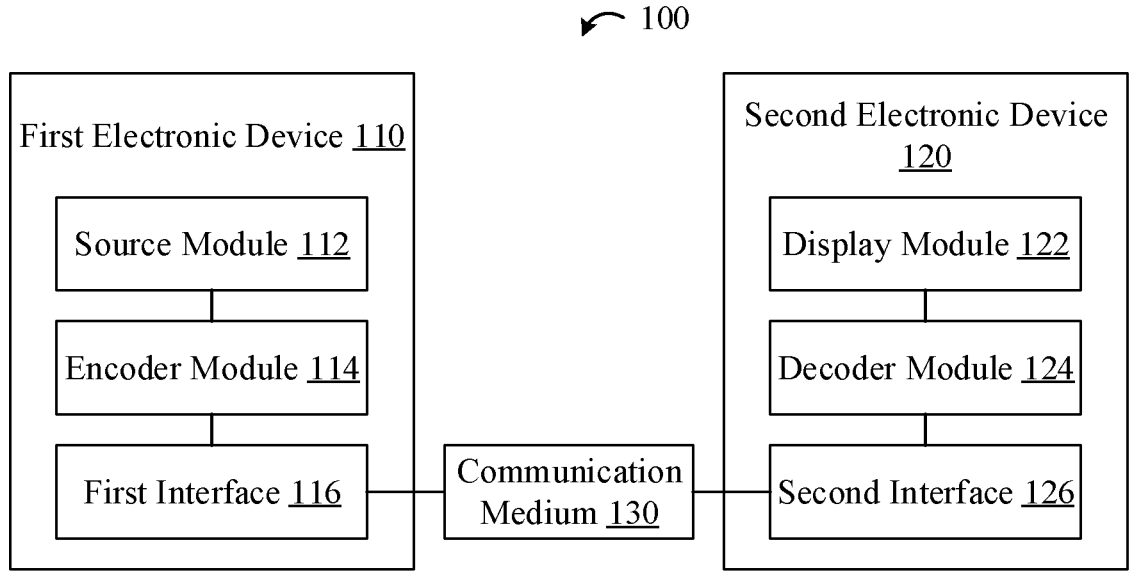
FIG. 1 illustrates a block diagram of a system configured to encode and decode video data according to an implementation of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other types of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
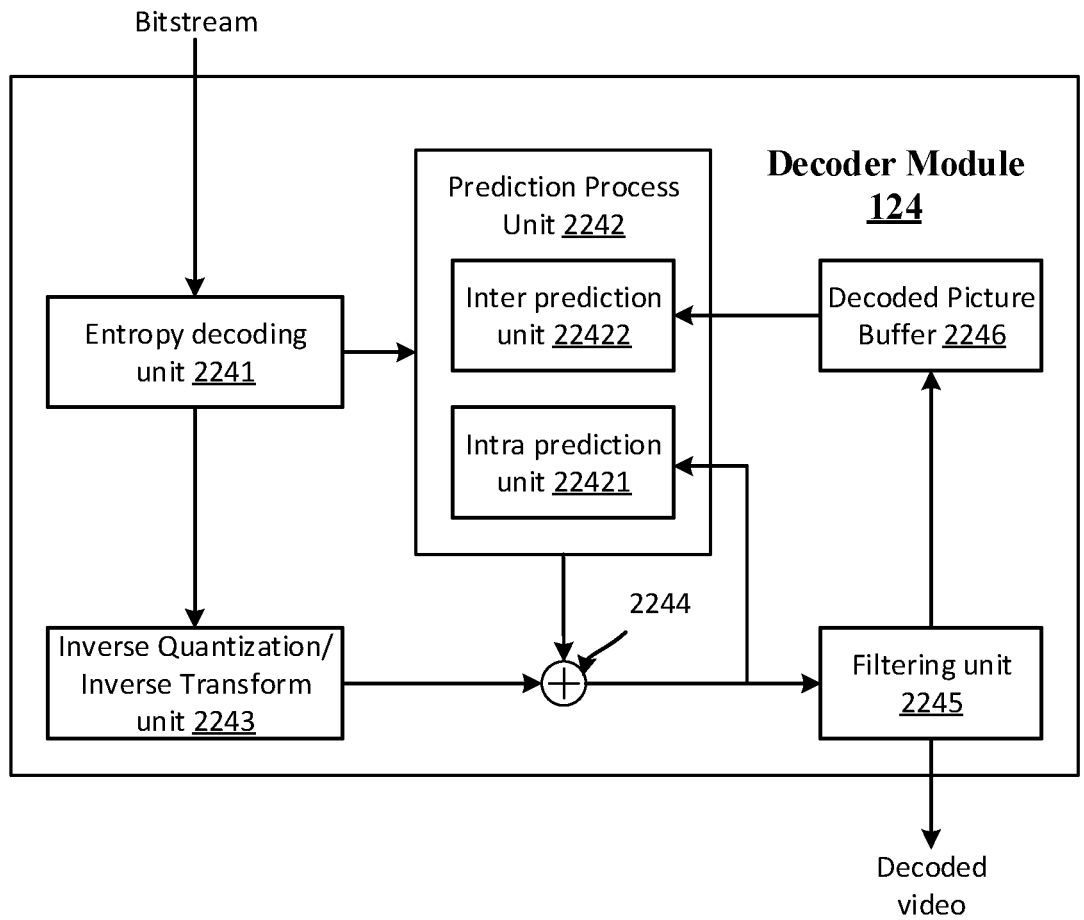
FIG. 2 illustrates a block diagram of a decoder module of a second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SB AC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loéve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
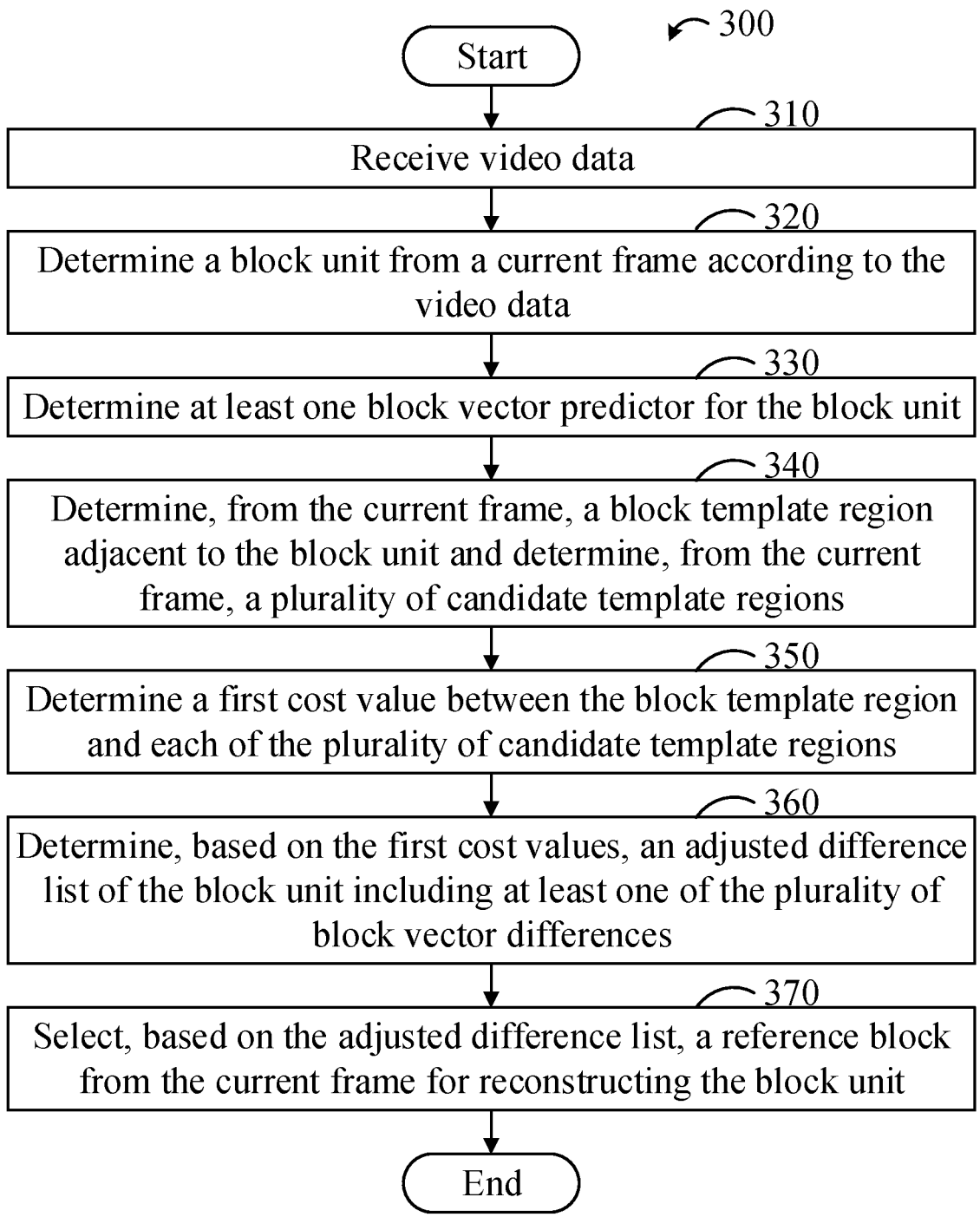
FIG. 3 illustrates a flowchart of a method for decoding/encoding video data by an electronic device according to an implementation of the present disclosure.

FIG. 3 illustrates a flowchart of a method 300 for decoding/encoding video data by an electronic device according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or fewer blocks may be utilized without departing from the present disclosure.

At block 310, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from a current frame according to the video data.

With reference to FIG. 1 and FIG. 2, the decoder module 124 may determine the image frames according to the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications based on any video coding standard.

At block 330, the decoder module 124 determines at least one block vector predictor for the block unit.

With reference to FIG. 1 and FIG. 2, the decoder module 124 determines a plurality of neighboring positions neighboring the block unit. The neighboring positions may be selected from at least one of a plurality of adjacent positions adjacent to the block unit or a plurality of non-adjacent positions non-adjacent to the block unit. Thus, in some implementations, the candidate positions may include at least one of the adjacent positions or the non-adjacent positions. In some implementations, the candidate positions may include at least one of the adjacent positions and at least one of the non-adjacent positions. In some implementations, the candidate positions may include at least one of the non-adjacent positions and exclude the adjacent positions. In some implementations, the candidate positions may exclude the non-adjacent positions and include at least one of the adjacent positions.

Figure 4:
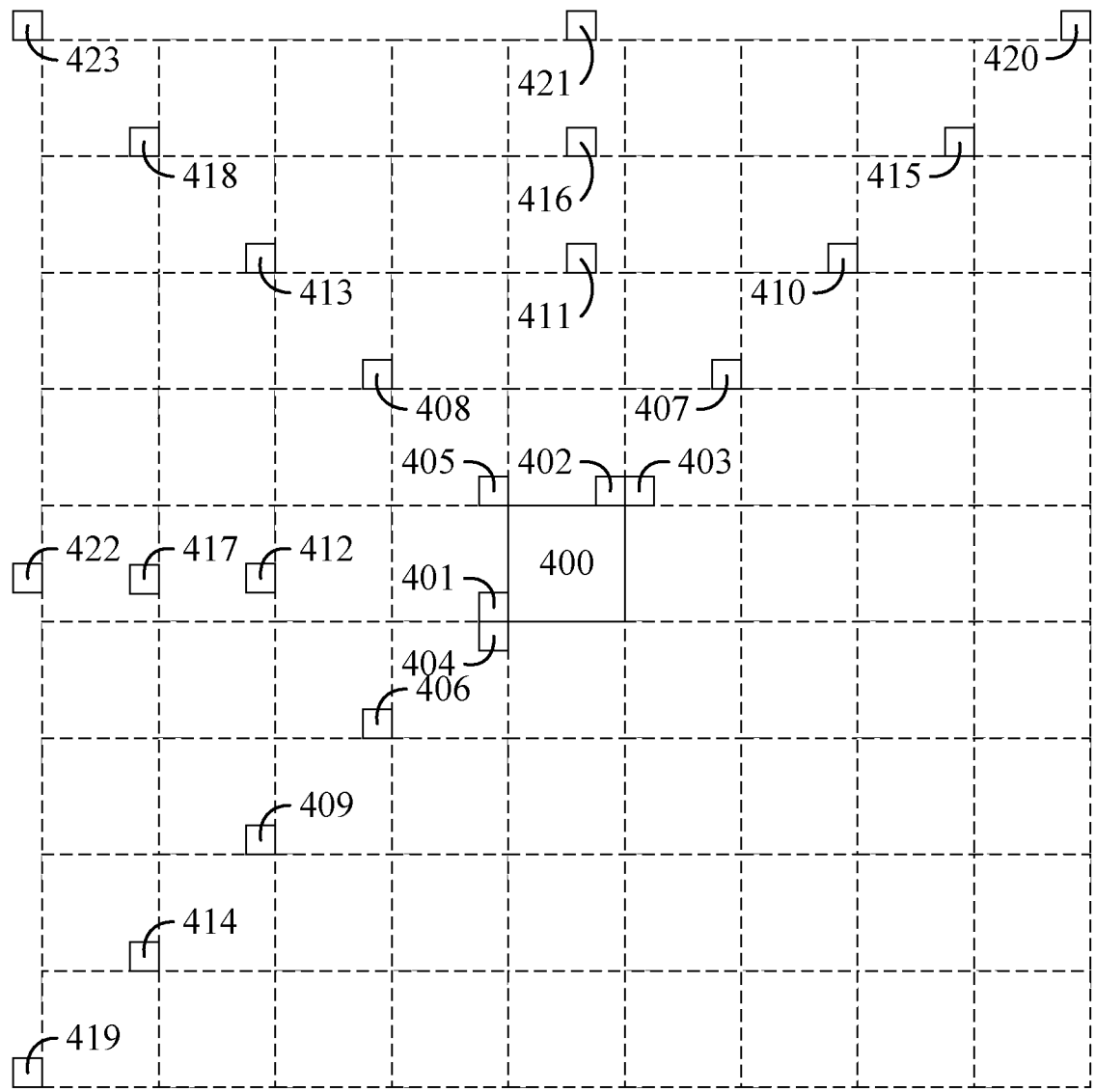
FIG. 4 is an illustration of an example implementation of a block and a plurality of neighboring positions according to an embodiment of the present disclosure.

FIG. 4 is an illustration of an example implementation of a block and a plurality of neighboring positions according to an embodiment of the present disclosure. With reference to FIG. 1 and FIG. 2, the decoder module 124 may determine a plurality of adjacent positions 401-405 adjacent to a block unit 400 and a plurality of non-adjacent positions 406-423 non-adjacent to block unit 400. Each of the adjacent positions 401-405 may be adjacent to one of the four corners of the block unit 400. In addition, a distance between the block unit 400 and one of the non-adjacent positions 406-423 may be based on one of a block height H, a block width W, or a diagonal length D of the block unit 400. For example, a horizontal distance and a vertical distance between a top-left position of the block unit 400 and the non-adjacent position 408 may be respectively equal to W+1 and H+1, and the distance between the block unit 400 and the non-adjacent position 411 may be equal to a distance value generated by adding one to twice of the block height H of the block unit 400.

Each of the neighboring positions may be covered by one of a plurality of neighboring blocks. The neighboring blocks may be a plurality of previously decoded blocks reconstructed prior to reconstructing the block unit. The decoder module 124 may further determine whether the neighboring blocks are predicted or reconstructed by an intra block copy (IBC) mode. When a specific one of the neighboring blocks is predicted or reconstructed based on an intra block vector by the IBC mode, the decoder module 124 may determine the intra block vector as one of a plurality of intra predictor candidates. When the specific neighboring block is not predicted or reconstructed by the IBC mode, the decoder module 124 may determine that there is no intra block vector of the specific neighboring block.

In some implementations, the at least one block vector predictor may be selected from the intra predictor candidates based on at least one predictor syntax. In some implementations, a predictor candidate list may be generated based on the intra predictor candidates. In some implementations, a capacity of the predictor candidate list may be defined by a predefined value or a signaled value parsed from the bitstream by the decoder module 124. For example, the capacity of the predictor candidate list may be equal to a number N, and the number N may be an integer. In other words, some of the intra predictor candidates may be selected to be a plurality of vector predictor candidates and added into the predictor candidate list based on a selection method and the others of the intra predictor candidates may be excluded from the predictor candidate list. For example, when one of the neighboring blocks may have the same block information (e.g., the intra block vector) as one of the other neighboring blocks, and the one of the other neighboring blocks may be excluded from adding block information into the predictor candidate list. In another implementation, all of the intra predictor candidates may be regarded as the vector predictor candidates and added into the predictor candidate list. In addition, the vector predictor candidates may further include a history-based candidate determined from a first-in-first-out (FIFO) table storing a plurality of previous block vectors of a plurality of previous blocks reconstructed prior to reconstructing the block unit.

In some implementations, the at least one block vector predictor may be determined from the predictor candidate list based on at least one predictor index. In some implementations, N block vector predictors may be determined based on first N of the vector predictor candidates. In some implementations, the vector predictor candidates in the predictor candidate list may be sorted based on an initial cost function.

In some implementations, the at least one block vector predictor may be determined from the vector predictor candidates in the predictor candidate list. In some implementations, N vector predictor candidates may be selected since the N vector predictor candidates are arranged in front of the others of the vector predictor candidates in the predictor candidate list. For example, a first two of the vector predictor candidates may be selected to be two block vector predictors.

In some implementations, the number of the at least one block vector predictor may be defined by a predefined value or a signaled value parsed from the bitstream by the decoder module 124. For example, the number of the at least one block vector predictor may be defined to be equal to or less than a number Q, and the number Q may be an integer. In some implementations, all of the vector predictor candidates may be set as the at least one block vector predictor. Thus, the number of the at least one block vector predictor may be equal to the number of the vector predictor candidates.

The decoder module 124 may determine a block template region adjacent to the block unit from the current frame. The block template region may include at least one of a plurality of adjacent regions. A first adjacent region may be an adjacent region located above the block unit, a second adjacent region may be an adjacent region located to the left side of the block unit, and a third adjacent region may be an adjacent region located to the top-left side of the block unit. The adjacent regions may be reconstructed prior to reconstructing the block unit. A height of the first adjacent region may be equal to a number R of the reconstructed samples of the first adjacent region along a vertical direction, and a width of the first adjacent region may be equal to a width of the block unit. A height of the second adjacent region may be equal to a height of the block unit, and a width of the second adjacent region may be equal to a number S of the reconstructed samples of the second adjacent region along a horizontal direction. In addition, a height of the third adjacent region may be equal to the number R of the reconstructed samples of the first adjacent region along the vertical direction, and a width of the third adjacent region may be equal to the number S of the reconstructed samples of the second adjacent region along the horizontal direction. In one implementation, the numbers R and S may be positive integers. In addition, the numbers R and S may be equal to or different from each other. Furthermore, the numbers R and S may be greater than or equal to one. In some implementations, the numbers R and S may be equal to one. In some implementations, a plurality of samples in the block template region is reconstructed prior to reconstructing the block unit.

The decoder module 124 may determine the block template region adjacent to the block unit. The decoder module 124 may use all of the adjacent regions as the block template region for determining the at least one block vector predictor. In addition, the decoder module 124 may use two of the adjacent regions as the block template region for determining the at least one block vector predictor. For example, the decoder module 124 may only use the first and second adjacent regions as the block template region for determining the at least one block vector predictor. Furthermore, the decoder module 124 may use only one of the adjacent regions as the block template region for determining the at least one block vector predictor.

In some implementations, the decoder module 124 may determine a plurality of block copy candidates based on the candidate positions included in the neighboring blocks used to generate the at least one block vector predictor. In other words, when the neighboring blocks are not predicted or reconstructed by the IBC mode, the decoder module 124 may not determine the block copy candidates derived according to the neighboring blocks. Furthermore, when the intra block vectors of the neighboring blocks are not selected as the at least one block vector predictor, the decoder module 124 may not determine the block copy candidates derived according to the neighboring blocks. In some implementations, the neighboring blocks used to generate the at least one block vector predictor may be regarded as at least one copy block predictor, so each of the at least one block vector predictor may be generated from the intra block vector of a corresponding one of the at least one copy block predictor.

The decoder module 124 may determine a plurality of copy template regions from the current frame. Each of the copy template regions may be adjacent to a corresponding one of the block copy candidates. Each of the copy template regions may include at least one of a plurality of adjacent regions for a corresponding one of the block copy candidates. A first adjacent region of a specific one of the block copy candidates may be an adjacent region located above the specific block copy candidate, a second adjacent region of the specific block copy candidate may be an adjacent region located to the left side of the specific block copy candidate, and a third adjacent region of the specific block copy candidate may be an adjacent region located to the top-left side of the specific block copy candidate. The adjacent regions of the block copy candidates may be reconstructed prior to reconstructing the block unit.

The decoder module 124 may determine a predictor cost value based on the block template region and each of the plurality of copy template regions by using a cost function to select the at least one block vector predictor for the block unit. The cost function may be a template matching cost function including, but not limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select at least one merge block candidate from the block copy candidates based on the predictor cost values calculated by the copy template regions. When the number of the at least one merge block candidate is equal to three, three specific ones of the neighboring positions corresponding to three specific ones of the block copy candidates having the three lowest cost values may be selected, and three intra block predictor indicated by three block vector predictors may be derived based on three specific ones of the vector predictor candidates corresponding to the three specific neighboring positions. When the number of the at least one merge block candidate is equal to one, a specific one of the neighboring positions corresponding to a specific one of the block copy candidates having the lowest cost value may be selected, and an intra block predictor indicated by a block vector predictor may be derived based on a specific one of the vector predictor candidates corresponding to the specific neighboring position. Thus, when the number of the at least one merge block candidate is equal to Y, Y neighboring positions may be selected based on the Y lowest cost values to determine Y vector predictor candidates. The number Y may be a positive integer.

Returning to FIG. 3, at block 340, the decoder module 124 determines, from the current frame, a block template region adjacent to the block unit and determines, from the current frame, a plurality of candidate template regions.

Each of the plurality of candidate template regions may be indicated by a specific one of the at least one block vector predictor and a corresponding one of a plurality of block vector differences. The block vector differences may be included in a vector difference list.

Each of the at least one block vector predictor may be used to direct from the block unit towards a corresponding one of the at least one intra block predictor. In addition, each of the block vector differences may be used to further direct from one of the at least one intra block predictor towards a corresponding one of a plurality of difference block candidates. In other words, the difference block candidates may be indicated by the plurality of block vector differences and one of the at least one block vector predictor.

Figure 5:
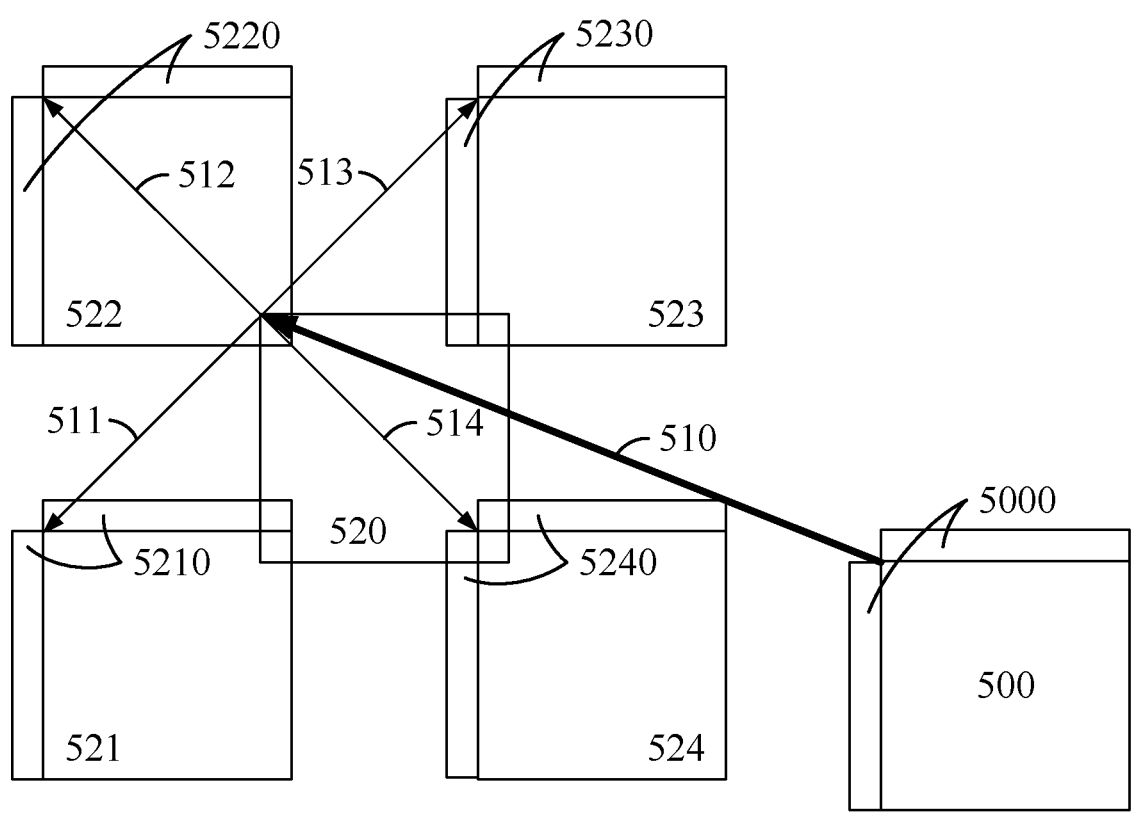
FIG. 5 is an illustration of an example implementation of a block unit, an intra block predictor, and a plurality of difference block candidates according to an embodiment of the present disclosure.

FIG. 5 is an illustration of an example implementation of a block unit 500, an intra block predictor 520, and a plurality of difference block candidates 521-524 according to an embodiment of the present disclosure. A block vector predictor 510 may be used to direct from the block unit 500 towards the intra block predictor 520. In addition, a plurality of block vector differences 511-514 may be used to direct from the intra block predictor 520 towards the difference block candidates 521-524. Each of the candidate template regions 5210, 5220, 5230, and 5240 may be adjacent to a corresponding one of the difference block candidates 521-524. The candidate template regions 5210, 5220, 5230, and 5240 may be determined for comparing with the block template region 5000.

With reference to FIG. 1 and FIG. 2, the decoder module 124 may directly determine a plurality of candidate template regions 5210, 5220, 5230, and 5240 based on a block vector predictor 510 and the block vector differences 511-514 without determining the intra block predictor 520 and the difference block candidates 521-524. The sizes and the shapes of the candidate template regions 5210, 5220, 5230, and 5240 may be identical to those of the block template region 5000. Thus, the decoder module 124 may directly determine an initial position for a specific one of candidate template regions 5210, 5220, 5230, and 5240 based on the block vector predictor 510 and a specific one of the block vector differences 511-514, and determine the specific candidate template region based on the initial position and the size and the shape of the block template region 5000. Each of the candidate template regions 5210, 5220, 5230, and 5240 may be indicated by a corresponding one of a plurality of combination vector candidates each generated by the block vector predictor 510 and a corresponding one of the block vector differences 511-514.

In some implementations, each of the block vector differences may be determined based on at least one vector difference magnitude and one of a plurality of vector difference directions. The at least one vector difference magnitude may be at least one distance between the intra block predictor and the difference block candidates. The vector difference directions may be directions directed from the intra block predictor towards the difference block candidates.

In some implementations, the vector difference directions may be predefined in the encoder module 114 and the decoder module 124. The decoder module 124 may select one of the vector difference directions for the block unit. In some implementations, the vector difference directions may be preset in a predefined direction table. For example, the vector difference directions may include at least one of the following sign candidates: (+, +), (+, −), (−, +), (−, −). Each of the sign candidates may indicate an x-component direction and a y-component direction. When one of the sign candidates (+, +) is selected, and the selected block vector difference may be regarded as (+BVD_x, +BVD_y). The following equation may be used to represent the calculation of BVD for IBC AMVP mode.

$$BVD[compIdx]=abs\_bvd\_greater0\_flag[compIdx]*(abs\_bvd\_minus2[compIdx]+2)*(1-2*bvd\_sign\_flag[compIdx])$$

In some implementations, the vector difference magnitude may be derived based on a syntax abs_bvd_minus2 included in the bitstream, and the vector difference direction may be derived based on a syntax bvd_sign_flag included in the bitstream. In addition, the value compIdx may indicate x component of the block vector or y component of the block vector. In some implementations, the vector difference directions may further include other directions different from the four sign candidates (+, +), (+, −), (−, +), (−, −). For example, the vector difference directions may include at least one of a vertical direction, a horizontal direction, or at least one inclined direction each having an inclined angle. In some implementations, the at least one inclined angle may include at least one of 30 degrees, 60 degrees, 120 degrees, or 150 degrees. In some implementations, the at least one inclined angle may be equal to $Ci×(π/Ni)$. The number Ni may be a positive integer greater than or equal to 2 and the number Ci may be an integer greater than or equal to 0 and less than 2Ni. In some implementations, the at least one inclined direction may include some angles having different number Ni when the at least one inclined angle may be equal to $Ci×(π/Ni)$. For example, the at least one inclined angle may include 0 degree, 60 degrees, 120 degrees, 180 degrees, 240 degrees, and 300 degrees in a first angle group with the number N1 of 3 and 45 degrees, 90 degrees, 135 degrees, 180 degrees, 225 degrees, 270 degrees, and 315 degrees in a second angle group with the number N2 of 4.

In some implementations, the at least one vector difference magnitude may be predefined in the encoder module 114 and the decoder module 124. In some implementations, the at least one vector difference magnitude may be preset in a predefined magnitude table. The predefined magnitude table may be used for IBC merge mode with block vector difference. The following table shows an example of the vector difference magnitudes. Thus, there may be at least one magnitude index parsed from the bitstream to indicate the value of the at least one vector difference magnitude.

| magnitude index | 0 | 1 | 2 | 3 | 4 | 5 | 6 | 7 |
|---|---|---|---|---|---|---|---|---|
| vector difference magnitude | ¼ | ½ | 1 | 2 | 4 | 8 | 16 | 32 |

The following table shows another example of the vector difference magnitudes. Thus, there may be at least one magnitude index parsed from the bitstream to indicate the value of the at least one vector difference magnitude. In some implementations, each of the vector difference magnitudes is a positive integer, so the decoder module 124 may determine a predicted block of the block unit without a fractional interpolation.

| magnitude index | 0 | 1 | 2 | 3 | 4 | 5 |
|---|---|---|---|---|---|---|
| vector difference magnitude | 1 | 2 | 4 | 8 | 16 | 32 |

In some implementations, each of the block vector differences may be determined based on one of the at least one vector difference magnitude and one of the vector difference directions. In some implementations, each of the block vector differences may be determined based on two of the at least one vector difference magnitude and one of the vector difference directions. The two of the at least one vector difference magnitude may be regarded as a first magnitude BVD_x for a horizontal direction and a second magnitude BVD_y for a vertical direction. Thus, the block vector differences may be represented as (+BVD_x, +BVD_y) when a selected one of the vector difference directions is the sign candidate (+, +). In some implementations, when the block vector difference is determined based on two of the at least one vector difference magnitude, the at least one vector difference magnitude may further include zero for indicating one of the vertical direction (0, ±BVD_y) and the horizontal direction (±BVD_x, 0). Thus, at least one of the plurality of vector difference magnitudes may be selected from the predefined magnitude table based on at least one magnitude index included in the video data.

Figure 6:
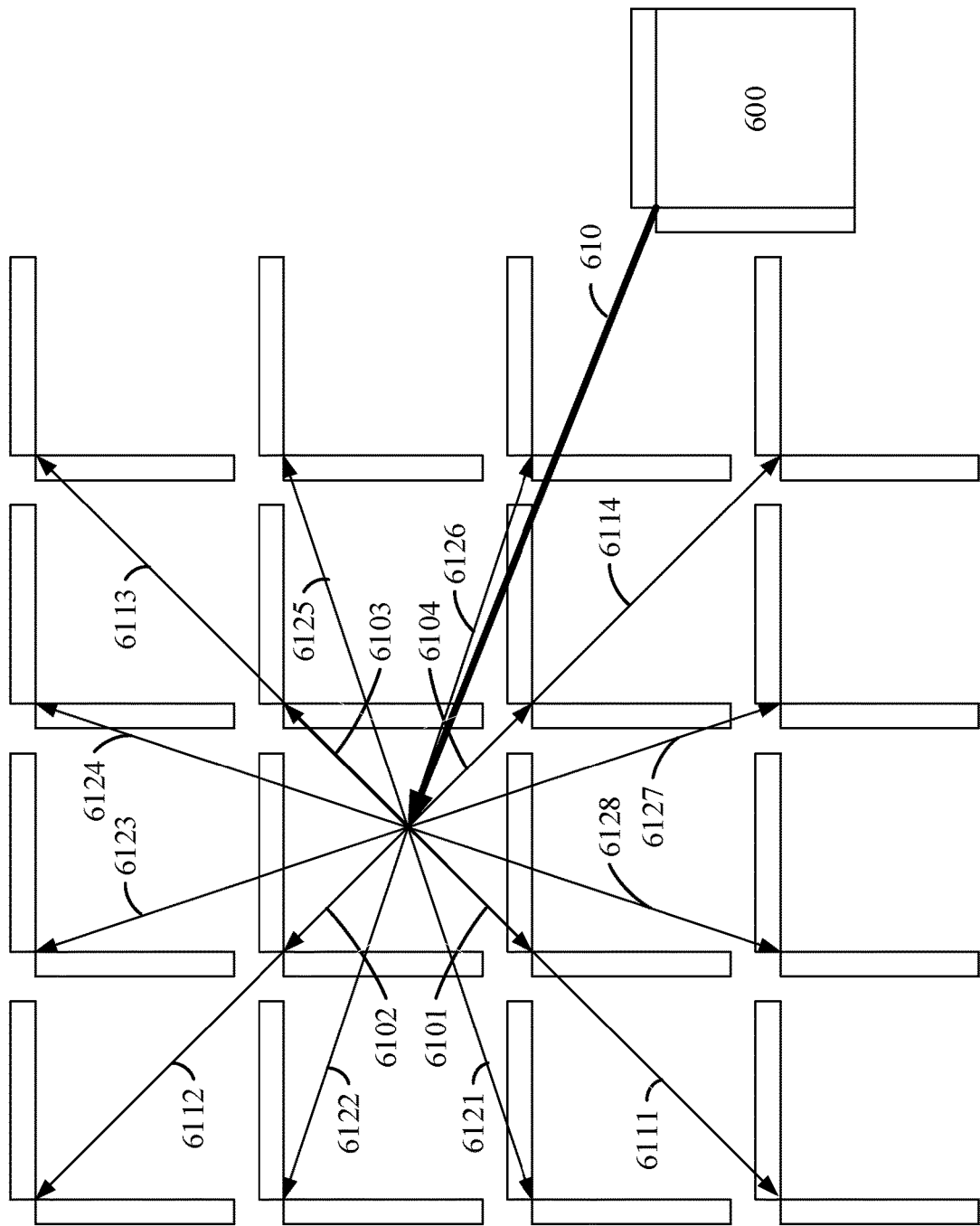
FIG. 6 is an illustration of an example implementation of a block unit, a block vector predictor, and a plurality of block vector differences according to an embodiment of the present disclosure.

FIG. 6 is an illustration of an example implementation of a block unit 600, a block vector predictor 610, and a plurality of block vector differences 6101-6104, 6111-6114, and 6121-6128 according to an embodiment of the present disclosure. The decoder module 124 may directly determine a plurality of candidate template regions based on the block vector predictor 610 and the block vector differences 6101-6104, 6111-6114, and 6121-6128 without determining the intra block predictor and the difference block candidates. Each of the candidate template regions may be indicated by a corresponding one of a plurality of combination vector candidates each generated by the block vector predictor 610 and a corresponding one of the block vector differences 6101-6104, 6111-6114, and 6121-6128. In addition, each of the block vector differences 6101-6104, 6111-6114, and 6121-6128 may be determined based on two of the at least one vector difference magnitude and one of the vector difference directions.

In some implementations, the at least one vector difference magnitude of the block vector differences may be predefined in the encoder module 114 and the decoder module 124, and the number of the at least one vector difference magnitude for the block vector differences may be equal to one. Thus, each of the block vector differences may be determined based on a corresponding one of the vector difference directions. For example, the at least one vector difference magnitude of the block vector differences may be predefined to be equal to two. Thus, the block vector differences may be generated based on the vector difference directions and one vector difference magnitude equal to two. For example, when the vector difference directions include the four sign candidates (+, +), (+, −), (−, +), (−, −), the four block vector differences may be generated as (2, 2), (2, −2), (−2, 2), and (−2, −2).

In some implementations, a specific one of the block vector differences may be invalid when a specific one of the combination vector candidates corresponding to the specific block vector difference exceeds a boundary of the current image. Thus, the specific block vector difference may not be determined for determining the candidate template regions. In some implementations, a specific one of the block vector differences directing towards a nearest boundary of the current image may also be excluded from the candidates of the vector difference directions. In some implementations, a specific one of the block vector differences may be invalid when a specific one of the combination vector candidates corresponding to the specific block vector difference exceeds a reconstructed region in the current image. The reconstructed region may include all coding blocks reconstructed prior to reconstructing the block unit. In some implementations, a specific one of the block vector differences may be invalid when a specific one of the combination vector candidates corresponding to the specific block vector difference exceeds a predefined reference region of the block unit. The predefined reference region may be determined based on a position relationship between the block unit and a current coding tree unit including the block unit.

In some implementations, when the number of the at least one block vector predictor is equal to Q and the number of the block vector differences is equal to O, the number of the candidate template regions and the number of the combination vector candidates may be equal to Q×O. In some implementations, a specific one of the at least one block vector predictor may be selected in advance based on a predictor index included in the video data. For example, the specific block vector predictor may be selected based on the predictor index included in the video data before the candidate template regions are determined. Thus, the number of the candidate template regions and the number of the combination vector candidates may be equal to the number O of the block vector differences.

Returning to FIG. 3, at block 350, the decoder module 124 determines a first cost value between the block template region and each of the plurality of candidate template regions.

With reference to FIG. 1 and FIG. 2, the decoder module 124 may determine a candidate cost value based on the block template region and each of the candidate template regions by using a cost function. With further reference to FIG. 5, since the candidate template regions 5210, 5220, 5230, and 5240 are reconstructed prior to reconstructing the block unit 550, the decoder module 124 may directly receive a plurality of reconstructed samples of the candidate template regions 5210, 5220, 5230, and 5240. The decoder module 124 may derive the candidate cost values between the block template region 5000 and each of the candidate template regions 5210, 5220, 5230, and 5240 by calculating a difference between the reconstructed samples in the block template region 5500 and the reconstructed samples in each of the candidate template regions 5210, 5220, 5230, and 5240.

The cost function may be a template matching cost function including, but not limited to, SAD, SATD, MAD, MSD, and SSIM. It should be noted that any cost function may be used without departing from this disclosure.

In order to distinguish the candidate cost values and the predictor cost values from each other, the candidate cost values may be regarded as the first cost values, and the predictor cost values may be regarded as a plurality of second cost values. Since the calculation of the second cost values may be one of a plurality of selection schemes in the method 300 for determining the at least one block vector predictor, there may be other selection schemes without calculating the second cost values. Thus, it may be unnecessary to calculate the second cost values in the method 300.

Returning to FIG. 3, at block 360, the decoder module 124 determines, based on the first cost values, an adjusted difference list of the block unit including at least one of the plurality of block vector differences.

With reference to FIG. 1 and FIG. 2, the decoder module 124 may determine an arrangement of the combination vector candidates based on the candidate cost values and reorder the combination vector candidates based on the arrangement. In some implementations, the combination vector candidates may be reordered in an ascending order or a descending order of the candidate cost values. In some implementations, the arrangement of the combination vector candidates may be determined based on the order of the block vector differences in the arrangement when a specific one of the at least one block vector predictor is selected in advance based on a predictor index included in the video data. For example, the specific block vector predictor may be selected based on the predictor index included in the video data before the candidate template regions are determined or before the candidate cost values are calculated. Thus, the decoder module 124 may determine an arrangement of the block vector differences based on the candidate cost values and reorder the block vector differences based on the arrangement. In addition, the arrangement may be used to adjust an original order of the block vector differences included in the vector difference list to generate the adjusted difference list having the at least one of the block vector differences since the specific block vector predictor is preselected for the block unit.

Before the arrangement is determined based on the candidate cost values, the combination vector candidates may be ordered based on arbitrary rules. For example, the combination vector candidates may be ordered based on a direction order of the vector difference directions. In addition, the block vector differences may also be ordered based on arbitrary rules when the specific block vector predictor is selected in advance.

The combination vector candidates may be reordered in the ascending order of the candidate cost values. Thus, when the candidate cost value of a specific one of the combination vector candidates is less than the candidate cost values of the other combination vector candidates, the specific combination vector candidate may be moved forward to be a first combination vector candidate based on the arrangement. In other words, the specific combination vector candidate may be moved to be the first combination vector candidate when the candidate cost value of the specific combination vector candidate is the minimum of the candidate cost values of the combination vector candidates. In addition, the specific combination vector candidate may be moved to be a last one of the combination vector candidates when the candidate cost value of the specific combination vector candidate is the maximum of the candidate cost values of the combination vector candidates. For example, the combination vector candidates may include eight combination vector candidates VC1-VC8 having eight candidate cost values CV1-CV8 when the number of the at least one block vector predictor is equal to two and the number of the block vector differences is equal to four. When a value order of the eight candidate cost values is CV4>CV2>CV5>CV8>CV1>CV6>CV3>CV7, the arrangement of the combination vector candidates may be changed from an original order of the eight combination vector candidates VC1, VC2, VC3, VC4, VC5, VC6, VC7, and VC8 to a new order of the eight combination vector candidates VC7, VC3, VC6, VC1, VC8, VC5, VC2, and VC4. Thus, the combination vector candidates may be ordered in the ascending order of the candidate cost values to generate the arrangement.

The block vector differences may be reordered in the ascending order of the candidate cost values when the specific block vector predictor is selected in advance. For example, the specific block vector predictor may be selected based on the predictor index included in the video data before the candidate template regions are determined or before the candidate cost values are calculated. Thus, when the candidate cost value of a specific one of the block vector differences is less than the candidate cost values of the other block vector differences, the specific block vector difference may be moved forward to be a first block vector difference based on the arrangement. In other words, the specific block vector difference may be moved to be the first block vector difference when the candidate cost value of the specific block vector difference is the minimum of the candidate cost values of the block vector difference. In addition, the specific block vector difference may be moved to be a last one of the block vector differences when the candidate cost value of the specific block vector difference is the maximum of the candidate cost values of the block vector difference. Thus, the block vector differences may be ordered in the ascending order of the candidate cost values to generate the arrangement.

The arrangement may be further determined by adjusting the new order of the combination vector candidates based on a diversity criterion. The decoder module 124 may determine a difference value between two of the combination vector candidates selected from two neighboring ones of the combination vector candidates ordered in the new order. When the difference value is less than or equal to a diversity threshold, the last one of the two neighboring ones of the combination vector candidates may be moved backward. For example, the value order of the eight candidate cost values is CV4>CV2>CV5>CV8>CV1>CV6>CV3>CV7, and the difference between two of the candidate cost values CV1 and CV6 is less than the diversity threshold. Thus, the combination vector candidate VC1 may be moved backward. Therefore, the arrangement of the combination vector candidates may be further changed from the new order of the eight combination vector candidates VC7, VC3, VC6, VC1, VC8, VC5, VC2, and VC4 to a final order of the eight combination vector candidates VC7, VC3, VC6, VC8, VC1, VC5, VC2, and VC4. In some implementations, the arrangement may not be determined by adjusting the new order of the combination vector candidates based on the diversity criterion, so the arrangement may be identical to the new order of the combination vector candidates.

The arrangement may be further determined by adjusting the new order of the block vector differences based on the diversity criterion when the specific block vector predictor is selected in advance. For example, the specific block vector predictor may be selected based on the predictor index included in the video data before the candidate template regions are determined or before the candidate cost values are calculated. The decoder module 124 may determine a difference value between two of the block vector differences selected from two neighboring ones of the block vector differences ordered in the new order. When the difference value is less than or equal to the diversity threshold, the last one of the two neighboring ones of the block vector differences may be moved backward. In some implementations, the arrangement may not be determined by adjusting the new order of the block vector differences based on the diversity criterion, so the arrangement may be identical to the new order of the block vector differences.

The decoder module 124 may select K combination vector candidates having the least candidate cost values from the combination vector candidates and add the selected combination vector candidates into an adjusted combination list. The number K, being a positive integer equal to or greater than one, may be equal to the number of the combination vector candidates in the adjusted combination list and less than the total quantity of the combination vector candidates. In other words, the decoder module 124 may select the first to the K-th combination vector candidates ordered based on the arrangement when the combination vector candidates are reordered in the ascending order of the candidate cost values to generate the arrangement.

The decoder module 124 may select K block vector differences having the least candidate cost values from the block vector differences and add the selected block vector differences into an adjusted difference list when the specific block vector predictor is selected in advance. For example, the specific block vector predictor may be selected based on the predictor index included in the video data before the candidate template regions are determined or before the candidate cost values are calculated. The number K, being a positive integer equal to or greater than one, may be equal to the number of the block vector differences in the adjusted difference list and less than the total quantity of the block vector differences. In other words, the decoder module 124 may select the first to the K-th block vector differences ordered based on the arrangement to add into the adjusted difference list when the block vector differences are reordered in the ascending order of the candidate cost values to generate the arrangement.

In some implementations, each of the combination vector candidates in the adjusted combination list may have an index value. Thus, the index value for the adjusted combination list may be within an index range of 0 to K−1 since the number of the combination vector candidates in the adjusted combination list is equal to K. In some implementations, each of the block vector differences in the adjusted difference list may have an index value. Thus, the index value for the adjusted difference list may be within an index range of 0 to K−1 since the number of the block vector differences in the adjusted difference list is equal to K.

Returning to FIG. 3, at block 370, the decoder module 124 selects, based on the adjusted difference list, a reference block from the current frame for reconstructing the block unit.

In some implementations, with reference to FIG. 1 and FIG. 2, the decoder module 124 may select, based on a prediction index, one of the combination vector candidates ordered based on the arrangement from the adjusted combination list. The prediction index may indicate one of the combination vector candidates for the block unit from the combination vector candidates ordered based on the arrangement in the adjusted combination list. In some implementations, the decoder module 124 may select, based on the prediction index, one of the block vector differences ordered based on the arrangement from the adjusted difference list. The prediction index may indicate one of the block vector differences for the block unit from the block vector differences ordered based on the arrangement in the adjusted difference list. The prediction index may be included in the video data.

In some implementations, an index value of the combination vector candidates may be within an index range of 0 to K−1. Therefore, the combination vector candidates arranged after a K-th of the combination vector candidates ordered by the arrangement may be excluded from selecting the specific combination vector candidate since the index value of the prediction index may not be greater than K−1. In some implementations. an index value of the block vector differences may be within an index range of 0 to K−1. Therefore, the block vector differences arranged after a K-th of the block vector differences ordered by the arrangement may be excluded from selecting the specific block vector difference since the index value of the prediction index may not be greater than K−1.

In some implementations, the decoder module 124 may determine a specific one of the combination vector candidates based on the prediction index. Thus, the decoder module 124 may determine a specific one of the plurality of block vector differences and a specific one of the at least one block vector predictor for reconstructing the block unit. In some implementations, the decoder module 124 may determine a specific one of the block vector differences based on the prediction index. Thus, since a specific one of the at least one block vector predictor is determined in advance, the decoder module 124 may determine the specific block vector differences and the specific block vector predictor for reconstructing the block unit. For example, the specific block vector predictor may be selected based on the predictor index included in the video data before the candidate template regions are determined or before the candidate cost values are calculated. Therefore, the decoder module 124 may determine a reference block from the current image for the block unit and generate a predicted block of the block unit based on the reference block without a fractional interpolation.

The decoder module 124 may further add a plurality of residual components into the prediction block to reconstruct the block unit. The residual components may be determined from the bitstream. The decoder module 124 may reconstruct all of the other block units in the current frame for reconstructing the current frame and the video data.

Figure 7:
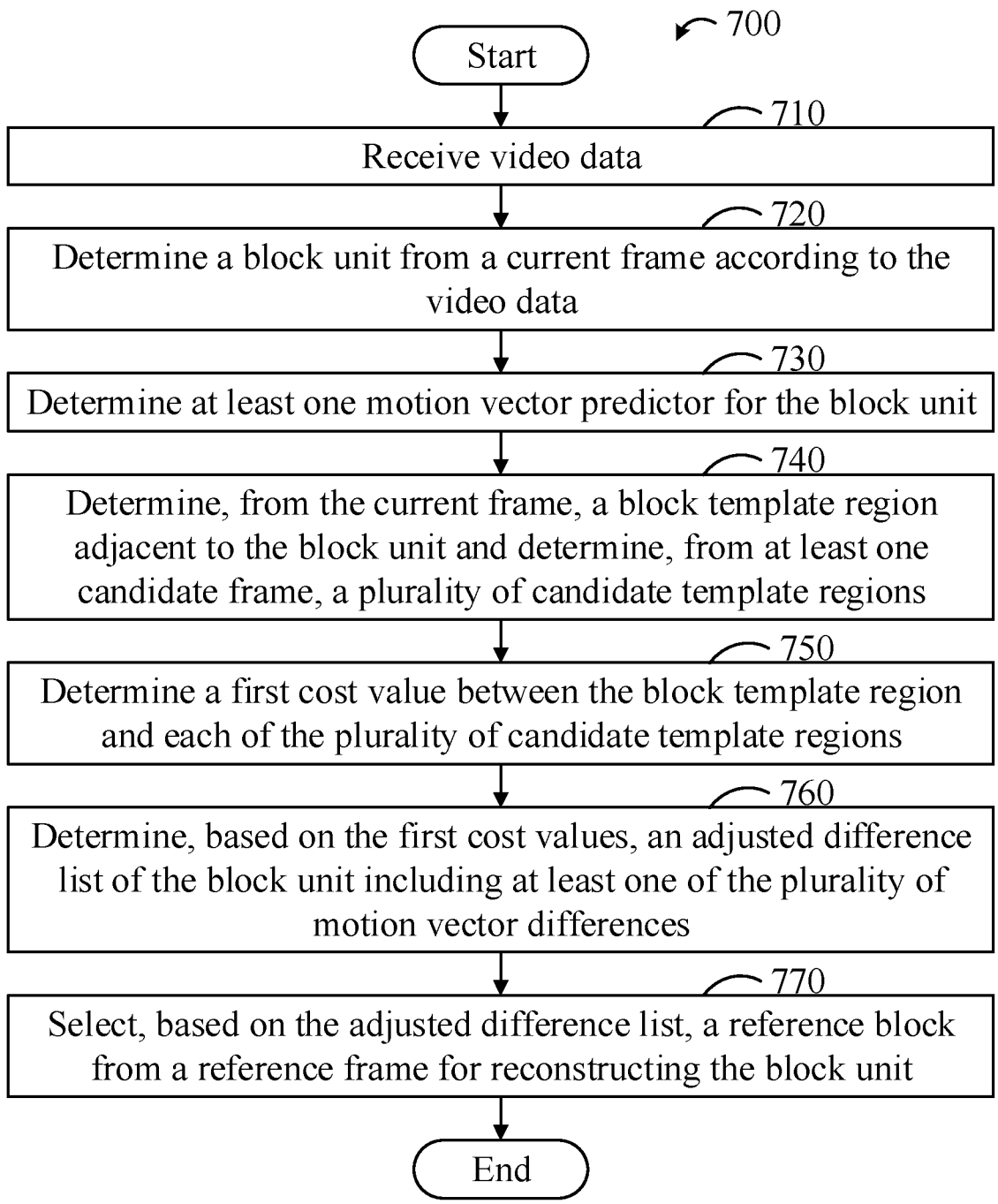
FIG. 7 illustrates a flowchart of a method for decoding/encoding video data by an electronic device according to an implementation of the present disclosure.

FIG. 7 illustrates a flowchart of a method 700 for decoding/encoding video data by an electronic device according to an implementation of the present disclosure. The method 700 is an example only, as there are a variety of ways to perform decoding of the video data.

The method 700 may be performed using the configurations illustrated in FIG. 1 and FIG. 2, and various elements of these figures are referenced with regard to the method 700. Each block illustrated in FIG. 7 may represent one or more processes, methods, or subroutines performed.

The order of blocks in FIG. 7 is illustrative only and may change. Additional blocks may be added or fewer blocks may be utilized without departing from the present disclosure.

At block 710, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 720, the decoder module 124 determines a block unit from a current frame according to the video data.

With reference to FIG. 1 and FIG. 2, the decoder module 124 may determine the image frames according to the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications based on any video coding standard.

At block 730, the decoder module 124 determines at least one motion vector predictor for the block unit.

With reference to FIG. 1 and FIG. 2, the decoder module 124 determines a plurality of neighboring positions neighboring the block unit. The neighboring positions may be selected from at least one of a plurality of adjacent positions adjacent to the block unit or a plurality of non-adjacent positions non-adjacent to the block unit. Thus, in some implementations, the candidate positions may include at least one of the adjacent positions or the non-adjacent positions. In some implementations, the candidate positions may include at least one of the adjacent positions and at least one of the non-adjacent positions. In some implementations, the candidate positions may include at least one of the non-adjacent positions and exclude the adjacent positions. In some implementations, the candidate positions may exclude the non-adjacent positions and include at least one of the adjacent positions.

With reference to FIG. 1, FIG. 2, and FIG. 4, the decoder module 124 may determine a plurality of adjacent positions 401-405 adjacent to a block unit 400 and a plurality of non-adjacent positions 406-423 non-adjacent to block unit 400. Each of the adjacent positions 401-405 may be adjacent to one of the four corners of the block unit 400. In addition, a distance between the block unit 400 and one of the non-adjacent positions 406-423 may be based on one of a block height H, a block width W, or a diagonal length D of the block unit 400. For example, a horizontal distance and a vertical distance between a top-left position of the block unit 400 and the non-adjacent position 408 may be respectively equal to W+1 and H+1, and the distance between the block unit 400 and the non-adjacent position 411 may be equal to a distance value generated by adding one to twice of the block height H of the block unit 400.

Each of the neighboring positions may be covered by one of a plurality of neighboring blocks. The neighboring blocks may be a plurality of previously decoded blocks reconstructed prior to reconstructing the block unit. The decoder module 124 may further determine whether the neighboring blocks are predicted or reconstructed by an inter prediction mode. When a specific one of the neighboring blocks is predicted or reconstructed based on one or more inter motion vectors and one or more reference frames by the inter prediction mode, the decoder module 124 may determine each of the one or more inter motion vectors and a corresponding one of the one or more reference frames as one of a plurality of motion predictor candidates. When the specific neighboring block is not predicted or reconstructed by the inter prediction mode, the decoder module 124 may determine that there is no inter motion vector of the specific neighboring block.

In some implementations, the at least one motion vector predictor may be selected from the motion predictor candidates based on at least one predictor syntax. In some implementations, a predictor candidate list may be generated based on the motion predictor candidates. In some implementations, a capacity of the predictor candidate list may be defined by a predefined value or a signaled value parsed from the bitstream by the decoder module 124. For example, the capacity of the predictor candidate list may be equal to a number N, and the number N may be an integer. In other words, some of the motion predictor candidates may be selected to be a plurality of merge predictor candidates and added into the predictor candidate list based on a selection method and the others of the motion predictor candidates may be excluded from the predictor candidate list. For example, when one of the neighboring blocks may have the same motion information (e.g., the one or more inter motion vectors and the one or more reference frames) as one of the other neighboring blocks, and the one of the other neighboring blocks may be excluded from adding motion information into the predictor candidate list. In another implementation, all of the motion predictor candidates may be regarded as the merge predictor candidates and added into the predictor candidate list. In addition, the merge predictor candidates may further include a history-based candidate determined from a first-in-first-out (FIFO) table storing a plurality of previous motion vectors of a plurality of previous blocks reconstructed prior to reconstructing the block unit. Furthermore, the merge predictor candidates may further include a plurality of temporal predictor candidates. In some implementations, each of the merge predictor candidates may include one or more of the inter motion vectors and one or more of the reference frames.

In some implementations, the at least one motion vector predictor may be determined from the predictor candidate list based on at least one predictor index. In some implementations, N motion vector predictors may be determined based on first N of the merge predictor candidates. In some implementations, the merge predictor candidates in the predictor candidate list may be sorted based on an initial cost function.

In some implementations, the at least one motion vector predictor may be determined from the merge predictor candidates in the predictor candidate list. In some implementations, N merge predictor candidates may be selected since the N merge predictor candidates are arranged in front of the others of the merge predictor candidates in the predictor candidate list. For example, a first two of the merge predictor candidates may be selected to determine two motion vector predictors. Thus, the inter motion vectors of the first two merge predictor candidates may be selected to be the two motion vector predictors.

In some implementations, the number of the at least one motion vector predictor may be defined by a predefined value or a signaled value parsed from the bitstream by the decoder module 124. For example, the number of the at least one motion vector predictor may be defined to be equal to or less than a number Q, and the number Q may be an integer. In some implementations, all of the merge predictor candidates may be used to determine the at least one motion vector predictor. Thus, all of the inter motion vectors in the merge predictor candidates may be selected to be the motion vector predictors, and the number of the at least one motion vector predictor may be equal to the number of the inter motion vectors in the merge predictor candidates.

The decoder module 124 may determine a block template region adjacent to the block unit from the current frame. The block template region may include at least one of a plurality of adjacent regions. A first adjacent region may be an adjacent region located above the block unit, a second adjacent region may be an adjacent region located to the left side of the block unit, and a third adjacent region may be an adjacent region located to the top-left side of the block unit. The adjacent regions may be reconstructed prior to reconstructing the block unit. A height of the first adjacent region may be equal to a number R of the reconstructed samples of the first adjacent region along a vertical direction, and a width of the first adjacent region may be equal to a width of the block unit. A height of the second adjacent region may be equal to a height of the block unit, and a width of the second adjacent region may be equal to a number S of the reconstructed samples of the second adjacent region along a horizontal direction. In addition, a height of the third adjacent region may be equal to the number R of the reconstructed samples of the first adjacent region along the vertical direction, and a width of the third adjacent region may be equal to the number S of the reconstructed samples of the second adjacent region along the horizontal direction. In one implementation, the numbers R and S may be positive integers. In addition, the numbers R and S may be equal to or different from each other. Furthermore, the numbers R and S may be greater than or equal to one. In some implementations, the numbers R and S may be equal to one. In some implementations, a plurality of samples in the block template region is reconstructed prior to reconstructing the block unit.

The decoder module 124 may determine the block template region adjacent to the block unit. The decoder module 124 may use all of the adjacent regions as the block template region for determining the at least one motion vector predictor. In addition, the decoder module 124 may use two of the adjacent regions as the block template region for determining the at least one motion vector predictor. For example, the decoder module 124 may only use the first and second adjacent regions as the block template region for determining the at least one motion vector predictor. Furthermore, the decoder module 124 may use only one of the adjacent regions as the block template region for determining the at least one motion vector predictor.

In some implementations, the decoder module 124 may determine a plurality of motion block candidates based on the candidate positions included in the neighboring blocks used to generate the at least one motion vector predictor. In other words, when the neighboring blocks are not predicted or reconstructed by the inter prediction mode, the decoder module 124 may not determine the motion block candidates derived according to the neighboring blocks. Furthermore, when the inter motion vectors of the neighboring blocks are not selected as the at least one motion vector predictor, the decoder module 124 may not determine the motion block candidates derived according to the neighboring blocks. In some implementations, the neighboring blocks used to generate the at least one motion vector predictor may be regarded as at least one motion block predictor, so each of the at least one motion vector predictor is generated from the inter motion vector of a corresponding one of the at least one motion block predictor. In some implementations, the candidate positions included in the at least one motion block predictor may be located at a top-left corner of a corresponding one of the motion block candidates.

The decoder module 124 may determine a plurality of motion template regions from the one or more reference frames. Each of the motion template regions may be adjacent to a corresponding one of the motion block candidates.

Each of the motion template regions may include at least one of a plurality of adjacent regions for a corresponding one of the motion block candidates. A first adjacent region of a specific one of the motion block candidates may be an adjacent region located above the specific motion block candidate, a second adjacent region of the specific motion block candidate may be an adjacent region located to the left side of the specific motion block candidate, and a third adjacent region of the specific motion block candidate may be an adjacent region located to the top-left side of the specific motion block candidate. The adjacent regions of the motion block candidates may be reconstructed prior to reconstructing the block unit.

The decoder module 124 may determine a predictor cost value based on the block template region and each of the plurality of motion template regions by using a cost function to select the at least one motion vector predictor for the block unit. The cost function may be a template matching cost function including, but not limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select at least one merge block candidate from the motion block candidates based on the predictor cost values calculated by the motion template regions. When the number of the at least one merge block candidate is equal to three, three specific ones of the neighboring positions corresponding to three specific ones of the motion block candidates having the three lowest cost values may be selected, and three temporal block predictor indicated by three motion vector predictors may be derived based on three specific ones of the merge predictor candidates corresponding to the three specific neighboring positions. When the number of the at least one merge block candidate is equal to one, a specific one of the neighboring positions corresponding to a specific one of the motion block candidates having the lowest cost value may be selected, and a temporal block predictor indicated by a motion vector predictor may be derived based on a specific one of the merge predictor candidates corresponding to the specific neighboring position. Thus, when the number of the at least one merge block candidate is equal to Y, Y neighboring positions may be selected based on the Y lowest cost values to determine Y merge predictor candidates. The number Y may be a positive integer.

In some implementations, at least one merge predictor candidate may be determined from the predictor candidate list based on at least one predictor index. The at least one predictor index may be parsed from the video data, and the parsed at least one predictor index may be used to indicate at least one specific merge predictor candidate in the predictor candidate list. Therefore, at least one motion vector predictor and at least one reference frame may be determined from the at least one specific merge predictor candidate.

In some implementations, only one motion vector predictor may be determined for predicting the block unit when the number of the at least one predictor index is equal to one.

Returning to FIG. 7, at block 740, the decoder module 124 determines, from the current frame, a block template region adjacent to the block unit and determine, from at least one reference frame, a plurality of candidate template regions.

Each of the plurality of candidate template regions may be indicated by a specific one of the at least one motion vector predictor and a corresponding one of a plurality of motion vector differences. The motion vector differences may be included in a vector difference list. The specific one of the at least one motion vector predictor and a specific one of the at least one reference frame may be selected based on the predictor index included in the video data.

With reference to FIG. 1 and FIG. 2, the decoder module 124 may directly determine the candidate template regions based on the specific motion vector predictor and the motion vector differences without determining the temporal block predictor and the difference block candidates. The sizes and the shapes of the candidate template regions may be identical to those of the block template region. Thus, the decoder module 124 may directly determine an initial position for a specific one of candidate template regions based on the motion vector predictor and a specific one of the motion vector differences, and determine the specific candidate template region based on the initial position and the size and the shape of the block template region. Each of the candidate template regions may be indicated by a corresponding one of a plurality of combination vector candidates each generated by the motion vector predictor and a corresponding one of the motion vector differences.

In some implementations, each of the motion vector differences may be determined based on at least one vector difference magnitude and one of a plurality of vector difference directions. The at least one vector difference magnitude may be at least one distance between the temporal block predictor and the difference block candidates. The vector difference directions may be directions directed from the temporal block predictor towards the difference block candidates.

In some implementations, the vector difference directions may be predefined in the encoder module 114 and the decoder module 124. The decoder module 124 may select one of the vector difference directions for the block unit. In some implementations, the vector difference directions may be preset in a predefined direction table. For example, the vector difference directions may include at least one of the following sign candidates: (+, +), (+, −), (−, +), (−, −). Each of the sign candidates may indicate an x-component direction and a y-component direction. When one of the sign candidates (+, +) is selected, and the selected motion vector difference may be regarded as (+MVD_x, +MVD_y). The following equation can be used to represent the calculation of MVD for inter AMVP.

$$MVD[\text{compIdx}] = \text{abs\_mvd\_greater0\_flag}[\text{compIdx}] * (\text{abs\_mvd\_minus2}[\text{compIdx}] + 2) * (1 - 2 * \text{mvd\_sign\_flag}[\text{compIdx}])$$

In some implementations, the vector difference magnitude may be derived based on a syntax abs_mvd_minus2 included in the bitstream, and the vector difference direction may be derived based on a syntax mvd_sign_flag included in the bitstream. In addition, the value compIdx may indicate x component of the block vector or y component of the block vector. In some implementations, the vector difference directions may further include other directions different from the four sign candidates (+, +), (+, −), (−, +), (−, −). For example, the vector difference directions may include at least one of a vertical direction, a horizontal direction, or at least one inclined direction each having an inclined angle. In some implementations, the at least one inclined angle may include at least one of 30 degrees, 60 degrees, 120 degrees, or 150 degrees. In some implementations, the at least one inclined angle may be equal to $C_i \times (\pi/N_i)$. The number $N_i$ may be a positive integer greater than or equal to 2 and the number $C_i$ may be an integer greater than or equal to 0 and less than 2Ni. In some implementations, the at least one inclined direction may include some angles having different number Ni when the at least one inclined angle may be equal to Ci×(π/Ni). For example, the at least one inclined angle may include 0 degree, 60 degrees, 120 degrees, 180 degrees, 240 degrees, and 300 degrees in a first angle group with the number N1 of 3 and 45 degrees, 90 degrees, 135 degrees, 180 degrees, 225 degrees, 270 degrees, and 315 degrees in a second angle group with the number N2 of 4.

In some implementations, the at least one vector difference magnitude may be predefined in the encoder module 114 and the decoder module 124. In some implementations, the at least one vector difference magnitude may be preset in a predefined magnitude table. The predefined magnitude table may be used for an inter merge mode with motion vector difference. The following table shows an example of the vector difference magnitudes. Thus, there may be at least one magnitude index parsed from the bitstream to indicate the value of the at least one vector difference magnitude.

| magnitude index | 0 | 1 | 2 | 3 | 4 | 5 | 6 | 7 |
|---|---|---|---|---|---|---|---|---|
| vector difference magnitude | ¼ | ½ | 1 | 2 | 4 | 8 | 16 | 32 |

In some implementations, each of the motion vector differences may be determined based on one of the at least one vector difference magnitude and one of the vector difference directions. In some implementations, each of the motion vector differences may be determined based on two of the at least one vector difference magnitude and one of the vector difference directions. The two of the at least one vector difference magnitude may be regarded as a first magnitude MVD_x for a horizontal direction and a second magnitude MVD_y for a vertical direction. Thus, the motion vector differences may be represented as (+MVD_x, +MVD_y) when a selected one of the vector difference directions is the sign candidate (+, +). In some implementations, when the motion vector difference is determined based on two of the at least one vector difference magnitude, the at least one vector difference magnitude may further include zero for indicating one of the vertical direction (0, ±MVD_y) and the horizontal direction(±MVD_x, 0). Thus, at least one of the plurality of vector difference magnitudes may be selected from the predefined magnitude table based on at least one magnitude index included in the video data.

In some implementations, the at least one vector difference magnitude of the motion vector differences may be predefined in the encoder module 114 and the decoder module 124, and the number of the at least one vector difference magnitude for the motion vector differences may be equal to one. Thus, each of the motion vector differences may be determined based on a corresponding one of the vector difference directions. For example, the at least one vector difference magnitude of the motion vector differences may be predefined to be equal to two. Thus, the motion vector differences may be generated based on the vector difference directions and one vector difference magnitude equal to two. For example, when the vector difference directions include the four sign candidates (+, +), (+, −), (−, +), (−, −), the four motion vector differences may be generated as (2, 2), (2, −2), (−2, 2), and (−2, −2).

In some implementations, a specific one of the motion vector differences directing towards a nearest boundary of the current image may also be excluded from the candidates of the vector difference directions. In some implementations, a specific one of the motion vector differences may be invalid when a specific one of the combination vector candidates corresponding to the specific motion vector difference exceeds a search region in the reference image. The search region may be determined based on a location of a reference block in the reference image.

In some implementations, when the number of the at least one motion vector predictor is equal to Q and the number of the motion vector differences is equal to O, the number of the candidate template regions and the number of the combination vector candidates may be equal to Q×O. In some implementations, a specific one of the at least one motion vector predictor may be selected in advance based on a predictor index included in the video data. For example, the specific motion vector predictor may be selected based on the predictor index included in the video data before the candidate template regions are determined. Thus, the number of the candidate template regions and the number of the combination vector candidates may be equal to the number O of the motion vector differences.

Returning to FIG. 7, at block 750, the decoder module 124 determines a first cost value between the block template region and each of the plurality of candidate template regions.

With reference to FIG. 1 and FIG. 2, the decoder module 124 may determine a candidate cost value based on the block template region and each of the candidate template regions by using a cost function. Since the candidate template regions are reconstructed prior to reconstructing the block unit, the decoder module 124 may directly receive a plurality of reconstructed samples of the candidate template regions. The decoder module 124 may derive the candidate cost values between the block template region and each of the candidate template regions by calculating a difference between the reconstructed samples in the block template region and the reconstructed samples in each of the candidate template regions.

The cost function may a template matching cost function including, but not being limited to, SAD, SATD, MAD, MSD, and SSIM. It should be noted that any cost function may be used without departing from this disclosure.

In order to distinguish the candidate cost values and the predictor cost values from each other, the candidate cost values may be regarded as the first cost values, and the predictor cost values may be regarded as a plurality of second cost values. Since the calculation of the second cost values may be one of a plurality of selection schemes in the method 700 for determining the at least one motion vector predictor, there may be other selection schemes without calculating the second cost values. Thus, it may be unnecessary to calculate the second cost values in the method 700.

Returning to FIG. 3, at block 760, the decoder module 124 determines, based on the first cost values, an adjusted difference list of the block unit including at least one of the plurality of motion vector differences.

With reference to FIG. 1 and FIG. 2, the decoder module 124 may determine an arrangement of the combination vector candidates based on the candidate cost values and reorder the combination vector candidates based on the arrangement. In some implementations, the combination vector candidates may be reordered in an ascending order or a descending order of the candidate cost values. In some implementations, the combination vector candidates may be determined based on the motion vector differences when a specific one of the at least one motion vector predictor is selected in advance based on the predictor index included in the video data. For example, the specific motion vector predictor may be selected based on the predictor index included in the video data before the candidate template regions are determined or before the candidate cost values are calculated. Thus, the decoder module 124 may determine an arrangement of the motion vector differences based on the candidate cost values and reorder the motion vector differences based on the arrangement. In addition, the arrangement may be used to adjust an original order of the motion vector differences included in the vector difference list to generate the adjusted difference list having the at least one of the motion vector differences since the specific motion vector predictor is pre-selected for the block unit.

Before the arrangement is determined based on the candidate cost values, the combination vector candidates may be ordered based on arbitrary rules. For example, the combination vector candidates may be ordered based on a direction order of the motion difference directions. In addition, the motion vector differences may also be ordered based on arbitrary rules when the specific motion vector predictor is selected in advance.

The motion vector differences may be reordered in the ascending order of the candidate cost values when the specific motion vector predictor is selected in advance. For example, the specific motion vector predictor may be selected based on the predictor index included in the video data before the candidate template regions are determined or before the candidate cost values are calculated. Thus, when the candidate cost value of a specific one of the motion vector differences is less than the candidate cost values of the other motion vector differences, the specific motion vector difference may be moved forward to be a first motion vector difference based on the arrangement. In other words, the specific motion vector difference may be moved to be the first motion vector difference when the candidate cost value of the specific motion vector difference is the minimum of the candidate cost values of the motion vector difference. In addition, the specific motion vector difference may be moved to be a last one of the motion vector differences when the candidate cost value of the specific motion vector difference is the maximum of the candidate cost values of the motion vector difference. For example, the motion vector differences may include four motion vector differences MVD1-MVD4 having four candidate cost values CV1-CV4 when the specific motion vector predictor is selected in advance and the number of the motion vector differences is equal to four. When a value order of the four candidate cost values is CV4>CV2>CV1>CV3, the arrangement of the motion vector differences may be changed from an original order of the four motion vector differences MVD1, MVD2, MVD3, MVD4 to a new order of the four motion vector differences MVD3, MVD1, MVD2, and MVD4. Thus, the motion vector differences may be ordered in the ascending order of the candidate cost values to generate the arrangement.

The arrangement may be further determined by adjusting the new order of the motion vector differences based on the diversity criterion when the specific motion vector predictor is selected in advance. For example, the specific motion vector predictor may be selected based on the predictor index included in the video data before the candidate template regions are determined or before the candidate cost values are calculated. The decoder module 124 may determine a difference value between two of the motion vector differences selected from two neighboring ones of the motion vector differences ordered in the new order. When the difference value is less than or equal to the diversity threshold, the last one of the two neighboring ones of the motion vector differences may be moved backward. For example, the value order of the four candidate cost values is CV4>CV2>CV1>CV3, and the difference between two of the candidate cost values CV2 and CV1 is less than the diversity threshold. Thus, the motion vector difference MVD2 may be moved backward. Therefore, the arrangement of the motion vector differences may be further changed from the new order of the four motion vector differences MVD3, MVD1, MVD2, and MVD4 to a final order of the four motion vector differences MVD3, MVD1, MVD4, and MVD2. In some implementations, the arrangement may not be determined by adjusting the new order of the motion vector differences based on the diversity criterion, so the arrangement may be identical to the new order of the motion vector differences.

The decoder module 124 may select K motion vector differences having the least candidate cost values from the motion vector differences and add the selected motion vector differences into an adjusted difference list when the specific motion vector predictor is selected in advance. For example, the specific motion vector predictor may be selected based on the predictor index included in the video data before the candidate template regions are determined or before the candidate cost values are calculated. The number K, being a positive integer equal to or greater than one, may be equal to the number of the motion vector differences in the adjusted difference list and less than the total quantity of the motion vector differences. In other words, the decoder module 124 may select the first to the K-th motion vector differences ordered based on the arrangement to add into the adjusted difference list when the motion vector differences are reordered in the ascending order of the candidate cost values to generate the arrangement.

In some implementations, each of the motion vector differences in the adjusted difference list may have an index value. Thus, the index value for the adjusted difference list may be within an index range of 0 to K−1 since the number of the motion vector differences in the adjusted difference list is equal to K.

Returning to FIG. 3, at block 770, the decoder module 124 selects, based on the adjusted difference list, a reference block from the reference frame for reconstructing the block unit.

In some implementations, with reference to FIG. 1 and FIG. 2, the decoder module 124 may select, based on a prediction index, one of the motion vector differences ordered based on the arrangement from the adjusted difference list when the specific motion vector predictor is selected in advance. The prediction index may indicate one of the motion vector differences for the block unit from the motion vector differences ordered based on the arrangement in the adjusted difference list. The prediction index may be included in the video data.

In some implementations, an index value of the motion vector differences may be within an index range of 0 to K−1. Therefore, the motion vector differences arranged after a K-th of the motion vector differences ordered by the arrangement may be excluded from selecting the specific motion vector difference since the index value of the prediction index may not be greater than K−1.

The decoder module 124 may determine a specific one of the motion vector differences based on the prediction index. Thus, since a specific one of the at least one motion vector predictor is determined in advance, the decoder module 124 may determine the specific motion vector differences and the specific motion vector predictor for reconstructing the block unit. For example, the specific motion vector predictor may be selected based on the predictor index included in the video data before the candidate template regions are determined or before the candidate cost values are calculated. Therefore, the decoder module 124 may determine a reference block from the reference image for the block unit with a fractional interpolation and generate a predicted block of the block unit based on the reference block.

The decoder module 124 may further add a plurality of residual components into the prediction block to reconstruct the block unit. The residual components may be determined from the bitstream. The decoder module 124 may reconstruct all of the other block units in the current frame for reconstructing the current frame and the video data.

Figure 8:
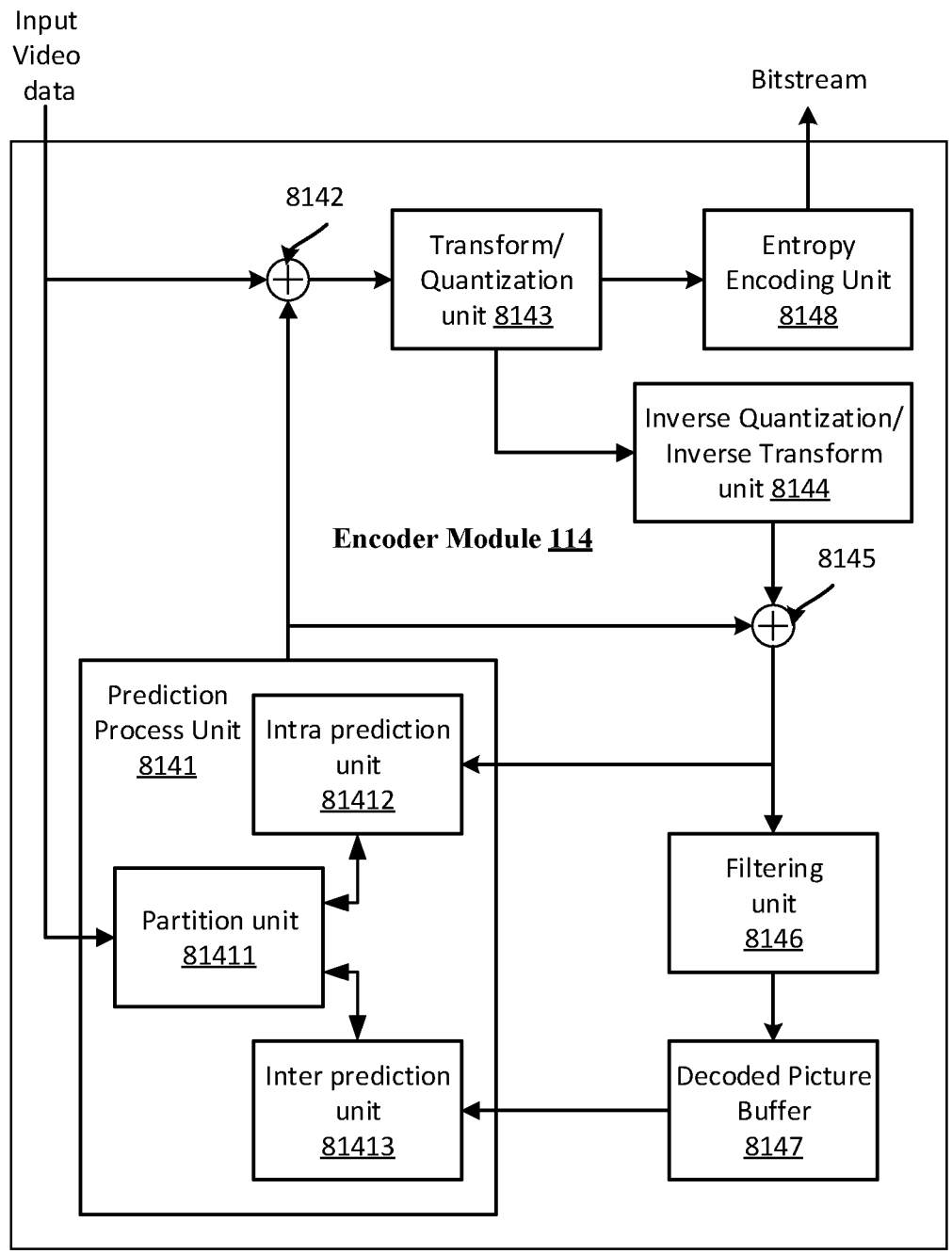
FIG. 8 illustrates a block diagram of an encoder module of a first electronic device illustrated in FIG. 1 according to an implementation of the present disclosure.

FIG. 8 illustrates a block diagram of the encoder module 114 of the first electronic device 110 illustrated in FIG. 1 according to an implementation of the present disclosure. The encoder module 114 may include a prediction processor (e.g., prediction process unit 8141), at least a first summer (e.g., first summer 8142) and a second summer (e.g., second summer 8145), a transform/quantization processor (e.g., transform/quantization unit 8143), an inverse quantization/inverse transform processor (e.g., inverse quantization/inverse transform unit 8144), a filter (e.g., filtering unit 8146), a decoded picture buffer (e.g., decoded picture buffer 8147), and an entropy encoder (e.g., entropy encoding unit 8148). The prediction process unit 8141 of the encoder module 114 may further include a partition processor (e.g., partition unit 81411), an intra prediction processor (e.g., intra prediction unit 81412), and an inter prediction processor (e.g., inter prediction unit 81413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 8141 may receive a current image block of a specific one of the image frames. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

The prediction process unit 8141 may select one of the coding results generated by the intra prediction unit 81412 and the inter prediction unit 81413 based on a mode selection method, such as a cost function. The mode selection method may be a rate-distortion optimization (RDO) process.

The prediction process unit 8141 may determine the selected coding result and provide a predicted block corresponding to the selected coding result to the first summer 8142 for generating a residual block and to the second summer 8145 for reconstructing the encoded block unit. The prediction process unit 8141 may further provide syntax elements, such as motion vectors, intra mode indicators, partition information, and other syntax information, to the entropy encoding unit 8148.

The intra prediction unit 81412 may intra predict the current block unit. The intra prediction unit 81412 may determine an intra prediction mode directed toward a reconstructed sample neighboring the current block unit in order to encode the current block unit.

The intra prediction unit 81412 may encode the current block unit using various intra prediction modes. The intra prediction unit 81412 of the prediction process unit 8141 may select an appropriate intra prediction mode from the selected modes. The intra prediction unit 81412 may encode the current block unit using a cross component prediction mode to predict one of the two chroma components of the current block unit based on the luma components of the current block unit. The intra prediction unit 81412 may predict a first one of the two chroma components of the current block unit based on the second of the two chroma components of the current block unit.

The inter prediction unit 81413 may inter predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the motion based on the received reference image blocks to generate the motion vector.

The first summer 8142 may generate the residual block by subtracting the prediction block determined by the prediction process unit 8141 from the original current block unit. The first summer 8142 may represent the component or components that perform this subtraction.

The transform/quantization unit 8143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 8143 may perform a scan of the matrix including the quantized transform coefficients. Alternatively, the entropy encoding unit 8148 may perform the scan.

The entropy encoding unit 8148 may receive a plurality of syntax elements from the prediction process unit 8141 and the transform/quantization unit 8143, including a quantization parameter, transform data, motion vectors, intra modes, partition information, and other syntax information. The entropy encoding unit 8148 may encode the syntax elements into the bitstream.

The entropy encoding unit 8148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 in FIG. 1) or archived for later transmission or retrieval.

The inverse quantization/inverse transform unit 8144 may apply inverse quantization and inverse transformation to reconstruct the residual block in the pixel domain for later use as a reference block. The second summer 8145 may add the reconstructed residual block to the prediction block provided from the prediction process unit 8141 in order to produce a reconstructed block for storage in the decoded picture buffer 8147.

The filtering unit 8146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 8145.

The decoded picture buffer 8147 may be a reference picture memory that stores the reference block for use by the encoder module 814 to encode video, such as in intra or inter coding modes. The decoded picture buffer 8147 may include a variety of memory devices, such as DRAM (e.g., including SDRAM), MRAM, RRAM, or other types of memory devices. The decoded picture buffer 8147 may be on-chip with other components of the encoder module 114 or off-chip relative to those components.

The method 300 for decoding/encoding video data may be performed by the first electronic device 110. With reference to FIG. 1, FIG. 3, and FIG. 8, at block 310, the encoder module 114 may receive the video data. The video data received by the encoder module 114 may be a video. At block 320, the encoder module 114 may determine a block unit from a current frame according to the video data. The encoder module 114 may divide the current frame to generate a plurality of CTUs, and further divide one of the CTUs to determine the block unit according to one of a plurality of partition schemes based on any video coding standard.

With reference to FIG. 1, FIG. 3, and FIG. 8, at block 330, the encoder module 114 may determine at least one block vector predictor for the block unit. The encoder module 114 may determine a plurality of neighboring positions neighboring the block unit. The neighboring positions may be selected from at least one of a plurality of adjacent positions adjacent to the block unit or a plurality of non-adjacent positions non-adjacent to the block unit. Each of the neighboring positions may be covered by one of a plurality of neighboring blocks reconstructed prior to reconstructing the block unit. When a specific one of the neighboring blocks is predicted or reconstructed based on an intra block vector by an intra block copy (IBC) mode, the encoder module 114 may determine the intra block vector as one of a plurality of intra predictor candidates. In some implementations, a capacity of a predictor candidate list including a plurality of vector predictor candidates selected from the intra predictor candidates may be defined by a predefined value or a signaled value parsed from the bitstream by the encoder module 114. In another implementation, all of the intra predictor candidates may be regarded as the vector predictor candidates and added into the predictor candidate list. In addition, the vector predictor candidates may further include a history-based candidate determined from a first-in-first-out (FIFO) table storing a plurality of previous block vectors of a plurality of previous blocks reconstructed prior to reconstructing the block unit. In some implementations, the number of the at least one block vector predictor may be defined by a predefined value or a signaled value signaled into the bitstream by the encoder module 114.

The encoder module 114 may determine a block template region adjacent to the block unit from the current frame. The block template region may include at least one of a plurality of adjacent regions. The encoder module 114 may determine a plurality of block copy candidates based on a plurality of candidate positions selected from the neighboring positions and included in the neighboring blocks for generating the at least one block vector predictor. The neighboring blocks used to generate the at least one block vector predictor may be regarded as at least one copy block predictor, so each of the at least one block vector predictor may be generated from the intra block vector of a corresponding one of the at least one copy block predictor. The encoder module 114 may determine a plurality of copy template regions from the current frame. Each of the copy template regions may be adjacent to a corresponding one of the block copy candidates. Each of the copy template regions may include at least one of a plurality of adjacent regions for a corresponding one of the block copy candidates.

The encoder module 114 may determine a predictor cost value based on the block template region and each of the plurality of copy template regions by using a cost function to select the at least one block vector predictor for the block unit. The encoder module 114 may select at least one merge block candidate from the block copy candidates based on the predictor cost values calculated by the copy template regions for determining the at least one block vector predictor. The selection scheme for the at least one block vector predictor in the encoder module 114 may be identical to that in the decoder module 124.

With reference to FIG. 1, FIG. 3, and FIG. 8, at block 340, the encoder module 114 may further determine, from the current frame, a plurality of candidate template regions. Each of the plurality of candidate template regions may be indicated by a specific one of the at least one block vector predictor and a corresponding one of a plurality of block vector differences. In some implementations, each of the block vector differences may be determined based on at least one vector difference magnitude and one of a plurality of vector difference directions when the block unit is predicted in an IBC merge mode. The at least one vector difference magnitude may be at least one distance between the intra block predictor and the difference block candidates. The vector difference directions may be directions directed from the intra block predictor towards the difference block candidates. In some implementations, each of the block vector differences may be generated based on a reference region of the block unit when the block unit is predicted in an IBC AMVP mode.

In some implementations, the encoder module 114 may first perform a candidate selection method for selecting a specific one of the at least one block vector predictor and a specific one of the block vector differences to predict the block unit, and then the encoder module 114 may perform a template matching cost function for determining how to signal the specific block vector difference into a bitstream. In some implementations, the encoder module 114 may first perform a template matching cost function for ordering the combinations of the at least one block vector predictor and the block vector differences to generate an adjusted difference list, and then the encoder module 114 may perform the candidate selection method for selecting a prediction candidate from the adjusted difference list. The candidate selection method may be a rate-distortion optimization (RDO) process. In addition, the encoder module 114 may only select a part of the combinations to add into the adjusted difference list.

When the candidate selection method is performed prior to performing the template matching cost function, at block 340, the encoder module 114 may predict the block unit based on the at least one block vector predictor and the block vector differences to generate a plurality of predicted blocks. Then, the encoder module 114 may further compare a plurality of predicted samples included in each of the predicted blocks with a plurality of color components in the block unit. Thus, the encoder module 114 may determine a block cost value for each of the predicted blocks and select a prediction candidate of the block unit based on the block cost value from the mode candidates in the candidate list by the candidate selection method. Then, the encoder module 114 may determine a plurality of residual components by comparing the color components in the block unit with the predicted samples generated based on the prediction candidate. Thus, a specific one of the at least one block vector predictor and a specific one of the block vector differences may be selected in advance, and then the encoder module 114 may use a template matching cost function to determine how to signal the specific block vector difference into a bitstream. Since the specific block vector difference is selected in advance, a specific one of the at least one vector difference magnitude and a specific one of the vector difference directions may be also determined in advance. However, in order to optimize the coding of the specific block vector difference, the encoder module 114 may use the template matching cost function for each of the block vector differences to generate the adjusted difference list. Thus, the number of the candidate template regions and the number of the combination vector candidates each generated by the specific block vector predictor and one of the block vector differences may be equal to the number O of the block vector differences. In addition, the encoder module 114 may directly signal the specific vector difference magnitude into a bitstream by an index or a syntax without reordering the order of the at least one vector difference magnitude. Thus, the template matching cost function applied to the block vector differences may be performed only for optimizing the coding of the specific vector difference direction when the candidate selection method is performed prior to performing the template matching cost function. In some implementations, the vector difference directions may only include at least one of the following sign candidates: (+, +), (+, −), (−, +), (−, −).

When the template matching cost function is performed prior to performing the candidate selection method, at block 340, the encoder module 114 may directly determine the candidate template regions based on the at least one block vector predictor and the block vector differences without performing the candidate selection method on all of the at least one block vector predictor and the block vector differences. In some implementations, a specific one of the at least one block vector predictor may be selected in advance by any other selection method. Thus, the number of the candidate template regions and the number of the combination vector candidates each generated by the specific block vector predictor and a corresponding one of the block vector differences may be equal to the number O of the block vector differences. In some implementations, when there is none of the specific block vector predictor selected before the template matching cost function, each of the combination of the at least one block vector predictor and the block vector differences may be used to generate the candidate template regions. Thus, the number of the candidate template regions and the number of the combination vector candidates each generated by the specific block vector predictor and a corresponding one of the block vector differences may be equal to a value generated by multiplying the number O of the block vector differences by the number Q of the at least one block vector predictor. In some implementations, the vector difference directions may include at least one of the following sign candidates: (+, +), (+, −), (−, +), (−, −). In some implementations, the vector difference directions may include other directions different from the four sign candidates (+, +), (+, −), (−, +), (−, −). In some implementations, at least one inclined angle for the vector difference directions may be equal to $\pm C_i \times (\pi/N_i)$. The number $N_i$ may be a positive integer greater than or equal to 2 and the number $C_i$ may be an integer greater than or equal to 0 and less than the number $N_i$. In some implementations, at least one inclined direction may include some angles having different number $N_i$.

With reference to FIG. 1, FIG. 3, and FIG. 8, at block 350, the encoder module 114 may determine a first cost value (e.g., a candidate cost value) between the block template region and each of the plurality of candidate template regions. Since the candidate template regions are reconstructed prior to reconstructing the block unit, the encoder module 114 may directly receive a plurality of reconstructed samples of the candidate template regions. The encoder module 114 may derive the candidate cost values between the block template region and each of the candidate template regions by calculating a difference between the reconstructed samples in the block template region and the reconstructed samples in each of the candidate template regions.

With reference to FIG. 1, FIG. 3, and FIG. 8, at block 360, the encoder module 114 may determine, based on the first cost values, the adjusted difference list of the block unit including at least one of the plurality of block vector differences.

When the candidate selection method is performed prior to performing the template matching cost function, at block 360, the encoder module 114 may determine an arrangement of the block vector differences based on the candidate cost values and reorder the block vector differences based on the arrangement. In addition, the encoder module 114 may directly signal the specific vector difference magnitude into a bitstream by an index or a syntax without reordering the order of the at least one vector difference magnitude. Thus, the vector difference directions may be reordered in an ascending order or a descending order of the candidate cost values without considering the order of the at least one vector difference magnitude to generate the arrangement. The arrangement may be further determined by adjusting the new order of the vector difference directions based on a diversity criterion. The encoder module 114 may determine a difference value between two of the vector difference directions selected from two neighboring ones of the vector difference directions ordered in the new order. When the difference value is less than or equal to a diversity threshold, the last one of the two neighboring ones of the vector difference directions may be moved backward.

When the template matching cost function is performed prior to performing the candidate selection method, the encoder module 114 may determine an arrangement of the combination vector candidates based on the candidate cost values and reorder the combination vector candidates based on the arrangement. In some implementations, the combination vector candidates may be reordered in an ascending order or a descending order of the candidate cost values. The arrangement may be further determined by adjusting the new order of the combination vector candidates based on the diversity criterion. The encoder module 114 may select K combination vector candidates having the least candidate cost values from the combination vector candidates and add the selected combination vector candidates into an adjusted combination list. In some implementations, the arrangement of the combination vector candidates may be determined based on the order of the block vector differences in the arrangement when a specific one of the at least one block vector predictor is selected in advance by any other selection method. The encoder module 114 may select K block vector differences having the least candidate cost values from the block vector differences and add the selected block vector differences into an adjusted difference list when the specific block vector predictor is selected in advance.

With reference to FIG. 1, FIG. 3, and FIG. 8, at block 370, the encoder module 114 may select, based on the adjusted difference list, a reference block from the current frame for reconstructing the block unit. The encoder module 114 may select the reference block to determine one of a plurality of predicted blocks, and then determine a plurality of residual components by comparing a plurality of color components in the block unit with a plurality of predicted samples in the determined predicted block. The encoder module 114 may further reconstruct the block unit based on the reference block in the current frame based on the adjusted difference list.

When the candidate selection method is performed prior to performing the template matching cost function, at block 370, the encoder module 114 may determine the reference block based on the specific block vector predictor and the specific block vector difference in the adjusted difference list to predict and reconstruct the block unit.

When the template matching cost function is performed prior to performing the candidate selection method, the encoder module 114 may predict the block unit based on the combination vector candidates to generate a plurality of predicted blocks. Then, the encoder module 114 may further compare a plurality of predicted samples included in each of the predicted blocks with a plurality of color components in the block unit. Thus, the encoder module 114 may determine a block cost value for each of the predicted blocks and select a prediction candidate of the block unit based on the block cost value from the mode candidates in the candidate list by the candidate selection method. The candidate selection method may be a rate-distortion optimization (RDO) process. In some implementations, one of the block vector differences in the adjusted difference list may be selected for selecting one of the combination vector candidates when a specific one of the at least one block vector predictor is selected in advance by any other selection method. The encoder module 114 may predict the block unit based on the block vector differences to generate a plurality of predicted blocks. Then, the encoder module 114 may further compare the predicted samples included in each of the predicted blocks with the color components in the block unit. The encoder module 114 may determine a plurality of residual components by comparing the color components in the block unit with the predicted samples generated based on the prediction mode. In addition, the residual components and a prediction index may be encoded into a bitstream for a decoder device to reconstruct the video data. The prediction index may indicate the selected one of the mode candidates in the candidate list. In some implementations, the prediction index may be an index to determine a selected one of the block vector differences when the specific block vector predictor is selected in advance by any other selection method.

The method 700 for decoding/encoding video data may be performed by the first electronic device 110. With reference to FIG. 1, FIG. 7, and FIG. 8, at block 710, the encoder module 114 may receive the video data. The video data received by the encoder module 114 may be a video. At block 720, the encoder module 114 may determine a block unit from a current frame according to the video data. The encoder module 114 may divide the current frame to generate a plurality of CTUs, and further divide one of the CTUs to determine the block unit according to one of a plurality of partition schemes based on any video coding standard.

With reference to FIG. 1, FIG. 7, and FIG. 8, at block 730, the encoder module 114 may determine at least one motion vector predictor for the block unit. The encoder module 114 may determine a plurality of neighboring positions neighboring the block unit. The neighboring positions may be selected from at least one of a plurality of adjacent positions adjacent to the block unit or a plurality of non-adjacent positions non-adjacent to the block unit. Each of the neighboring positions may be covered by one of a plurality of neighboring blocks reconstructed prior to reconstructing the block unit. When a specific one of the neighboring blocks is predicted or reconstructed based on an inter motion vector and a reference frame by an inter prediction mode, the encoder module 114 may determine the inter motion vector and the reference frame as one of a plurality of motion predictor candidates. In some implementations, a capacity of a predictor candidate list including a plurality of merge predictor candidates selected from the motion predictor candidates may be defined by a predefined value or a signaled value signaled in the bitstream by the encoder module 114. In another implementations, all of the motion predictor candidates may be regarded as the merge predictor candidates and added into the predictor candidate list. In addition, the merge predictor candidates may further include a history-based candidate determined from a first-in-first-out (FIFO) table storing a plurality of previous block vectors of a plurality of previous blocks reconstructed prior to reconstructing the block unit. Furthermore, the merge predictor candidates may further include a plurality of temporal predictor candidates. In some implementations, each of the merge predictor candidates may include a corresponding one of the inter motion vectors and a corresponding one of the reference frames. In some implementations, the number of the at least one motion vector predictor may be defined by a predefined value or a signaled value signaled into the bitstream by the encoder module 114.

The encoder module 114 may determine, from the current frame, a block template region adjacent to the block unit and determine, from at least one reference frame, a plurality of candidate template regions. The encoder module 114 may determine a plurality of motion block candidates based on a plurality of candidate positions selected from the neighboring positions and included in the neighboring blocks for generating the at least one motion vector predictor. The neighboring blocks used to generate the at least one motion vector predictor may be regarded as at least one motion block predictor, so each of the at least one motion vector predictor may be generated from the inter motion vector of a corresponding one of the at least one motion block predictor. The encoder module 114 may determine a plurality of motion template regions from the one or more reference frames. Each of the motion template regions may be adjacent to a corresponding one of the motion block candidates. Each of the motion template regions may include at least one of a plurality of adjacent regions for a corresponding one of the motion block candidates.

The encoder module 114 may determine a predictor cost value based on the block template region and each of the plurality of motion template regions by using a cost function to select the at least one motion vector predictor for the block unit. The encoder module 114 may select at least one merge block candidate from the motion block candidates based on the predictor cost values calculated by the motion template regions for determining the at least one motion vector predictor. The selection scheme for the at least one motion vector predictor in the encoder module 114 may be identical to that in the decoder module 124.

With reference to FIG. 1, FIG. 7, and FIG. 8, at block 740, the encoder module 114 may further determine, from the current frame, a plurality of candidate template regions. Each of the plurality of candidate template regions may be indicated by a specific one of the at least one motion vector predictor and a corresponding one of a plurality of motion vector differences. In some implementations, each of the motion vector differences may be determined based on at least one vector difference magnitude and one of a plurality of vector difference directions when the block unit is predicted in an inter merge mode. The at least one vector difference magnitude may be at least one distance between the inter block predictor and the difference block candidates. The vector difference directions may be directions directed from the inter block predictor towards the difference block candidates. In some implementations, each of the motion vector differences may be generated based on a search region of the block unit when the block unit is predicted in an inter AMVP mode. The motion vector differences may be included in a vector difference list.

The encoder module 114 may determine a collocated block in a specific one of the one or more reference frames based on a position of the block unit in the current frame. A specific one of the at least one motion vector predictor may be used to direct from the collocated block towards a specific one of the at least one temporal block predictor. In addition, each of the motion vector differences may be used to further direct from the specific temporal block predictor towards a corresponding one of a plurality of difference block candidates. Each of the candidate template regions may be adjacent to a corresponding one of the difference block candidates. The candidate template regions may be determined for comparing with the block template region. Each of the motion vector differences may be determined based on at least one vector difference magnitude and one of a plurality of vector difference directions. The at least one vector difference magnitude may be at least one distance between the temporal block predictor and the difference block candidates. The vector difference direction may be directions directed from the temporal block predictor towards the difference block candidates.

In some implementations, the encoder module 114 may first perform a candidate selection method for selecting a specific one of the at least one motion vector predictor and a specific one of the motion vector differences to predict the block unit, and then the encoder module 114 may perform a template matching cost function for determining how to signal the specific motion vector difference into a bitstream. In some implementations, the encoder module 114 may first perform a template matching cost function for ordering the combinations of the at least one motion vector predictor and the motion vector differences to generate an adjusted difference list, and then the encoder module 114 may perform the candidate selection method for selecting a prediction candidate from the adjusted difference list. The candidate selection method may be a rate-distortion optimization (RDO) process. In addition, the encoder module 114 may only select a part of the combinations to add into the adjusted difference list.

When the candidate selection method is performed prior to performing the template matching cost function, at block 740, the encoder module 114 may predict the block unit based on the at least one motion vector predictor and the motion vector differences to generate a plurality of predicted blocks. Then, the encoder module 114 may further compare a plurality of predicted samples included in each of the predicted blocks with a plurality of color components in the block unit. Thus, the encoder module 114 may determine a block cost value for each of the predicted blocks and select a prediction candidate of the block unit based on the block cost value from the mode candidates in the candidate list by the candidate selection method. Then, the encoder module 114 may determine a plurality of residual components by comparing the color components in the block unit with the predicted samples generated based on the prediction candidate. Thus, a specific one of the at least one motion vector predictor and a specific one of the motion vector differences may be selected in advance, and then the encoder module 114 may use a template matching cost function to determine how to signal the specific motion vector difference into a bitstream. Since the specific motion vector difference is selected in advance, a specific one of the at least one vector difference magnitude and a specific one of the vector difference directions may be also determined in advance. However, in order to optimize the coding of the specific motion vector difference, the encoder module 114 may use the template matching cost function for each of the motion vector differences to generate the adjusted difference list. Thus, the number of the candidate template regions and the number of the combination vector candidates each generated by the specific motion vector predictor and one of the motion vector differences may be equal to the number O of the motion vector differences. In addition, the encoder module 114 may directly signal the specific vector difference magnitude into a bitstream by an index or a syntax without reordering the order of the at least one vector difference magnitude. Thus, the template matching cost function applied to the motion vector differences may be performed only for optimizing the coding of the specific vector difference direction when the candidate selection method is performed prior to performing the template matching cost function. In some implementations, the vector difference directions may only include at least one of the following sign candidates: (+, +), (+, −), (−, +), (−, −).

When the template matching cost function is performed prior to performing the candidate selection method, at block 740, the encoder module 114 may directly determine the candidate template regions based on the at least one motion vector predictor and the motion vector differences without performing the candidate selection method on all of the at least one motion vector predictor and the motion vector differences. In some implementations, a specific one of the at least one motion vector predictor may be selected in advance by any other selection method. Thus, the number of the candidate template regions and the number of the combination vector candidates each generated by the specific motion vector predictor and a corresponding one of the motion vector differences may be equal to the number O of the motion vector differences. In some implementations, when there is none of the specific motion vector predictor selected before the template matching cost function, each of the combination of the at least one motion vector predictor and the motion vector differences may be used to generate the candidate template regions. Thus, the number of the candidate template regions and the number of the combination vector candidates each generated by the specific motion vector predictor and a corresponding one of the motion vector differences may be equal to a value generated by multiplying the number O of the motion vector differences by the number Q of the at least one motion vector predictor. In some implementations, the vector difference directions may include at least one of the following sign candidates: (+, +), (+, −), (−, +), (−, −). In some implementations, the vector difference directions may include other directions different from the four sign candidates (+, +), (+, −), (−, +), (−, −). In some implementations, at least one inclined angle for the vector difference directions may be equal to $\pm C_i \times (\pi/N_i)$. The number $N_i$ may be a positive integer greater than or equal to 2 and the number $C_i$ may be an integer greater than or equal to 0 and less than the number $N_i$. In some implementations, at least one inclined direction may include some angles having different number $N_i$.

With reference to FIG. 1, FIG. 7, and FIG. 8, at block 750, the encoder module 114 may determine a first cost value (e.g., a candidate cost value) between the block template region and each of the plurality of candidate template regions. Since the candidate template regions are reconstructed prior to reconstructing the block unit, the encoder module 114 may directly receive a plurality of reconstructed samples of the candidate template regions. The encoder module 114 may derive the candidate cost values between the block template region and each of the candidate template regions by calculating a difference between the reconstructed samples in the block template region and the reconstructed samples in each of the candidate template regions.

With reference to FIG. 1, FIG. 7, and FIG. 8, at block 760, the encoder module 114 may determine, based on the first cost values (e.g., a candidate cost value), the adjusted difference list of the block unit including at least one of the plurality of motion vector differences.

When the candidate selection method is performed prior to performing the template matching cost function, at block 760, the encoder module 114 may determine an arrangement of the motion vector differences based on the candidate cost values and reorder the motion vector differences based on the arrangement. In addition, the encoder module 114 may directly signal the specific vector difference magnitude into a bitstream by an index or a syntax without reordering the order of the at least one vector difference magnitude. Thus, the vector difference directions may be reordered in an ascending order or a descending order of the candidate cost values without considering the order of the at least one vector difference magnitude to generate the arrangement. The arrangement may be further determined by adjusting the new order of the vector difference directions based on a diversity criterion. The encoder module 114 may determine a difference value between two of the vector difference directions selected from two neighboring ones of the vector difference directions ordered in the new order. When the difference value is less than or equal to a diversity threshold, the last one of the two neighboring ones of the vector difference directions may be moved backward.

When the template matching cost function is performed prior to performing the candidate selection method, the encoder module 114 may determine an arrangement of the combination vector candidates based on the candidate cost values and reorder the combination vector candidates based on the arrangement. In some implementations, the combination vector candidates may be reordered in an ascending order or a descending order of the candidate cost values.

The arrangement may be further determined by adjusting the new order of the motion vector differences based on the diversity criterion. The encoder module 114 may select K motion vector differences having the least candidate cost values from the motion vector differences and add the selected motion vector differences into an adjusted combination list.

In some implementations, the arrangement of the combination vector candidates may be determined based on the order of the motion vector differences in the arrangement when a specific one of the at least one motion vector predictor is selected in advance by any other selection method. The encoder module 114 may select K motion vector differences having the least candidate cost values from the motion vector differences and add the selected motion vector differences into an adjusted difference list when the specific motion vector predictor is selected in advance.

With reference to FIG. 1, FIG. 7, and FIG. 8, at block 770, the encoder module 114 may select, based on the adjusted difference list, a reference block from the current frame for reconstructing the block unit. The encoder module 114 may select the reference block from a specific one of the one or more reference frames to determine one of a plurality of predicted blocks, and then determine a plurality of residual components by comparing a plurality of color components in the block unit with a plurality of predicted samples in the determined predicted block. The encoder module 114 may further reconstruct the block unit based on the reference block in the current frame based on the adjusted difference list.

When the candidate selection method is performed prior to performing the template matching cost function, at block 770, the encoder module 114 may determine the reference block based on the specific motion vector predictor and the specific motion vector difference in the adjusted difference list to predict and reconstruct the block unit.

When the template matching cost function is performed prior to performing the candidate selection method, the encoder module 114 may predict the block unit based on the combination vector candidates to generate a plurality of predicted blocks. Then, the encoder module 114 may further compare a plurality of predicted samples included in each of the predicted blocks with a plurality of color components in the block unit. Thus, the encoder module 114 may determine a block cost value for each of the predicted blocks and select a prediction candidate of the block unit based on the block cost value from the mode candidates in the candidate list by the candidate selection method. The candidate selection method may be a rate-distortion optimization (RDO) process. In some implementations, one of the motion vector differences in the adjusted difference list may be selected for selecting one of the combination vector candidates when a specific one of the at least one motion vector predictor is selected in advance by any other selection method. The encoder module 114 may predict the block unit based on the motion vector differences to generate a plurality of predicted blocks. Then, the encoder module 114 may further compare the predicted samples included in each of the predicted blocks with the color components in the block unit. The encoder module 114 may determine a plurality of residual components by comparing the color components in the block unit with the predicted samples generated based on the prediction mode. In addition, the residual components and a prediction index may be encoded into a bitstream for a decoder device to reconstruct the video data. The prediction index may indicate the selected one of the mode candidates in the candidate list. In some implementations, the prediction index may be an index to determine a selected one of the motion vector differences when the specific motion vector predictor is selected in advance by any other selection method.

Therefore, the encoder module 114 may also use the method 300 and the method 700 to predict and reconstruct the block unit for encoding the video data into the bitstream. Since the encoder module 114 and the decoder module 124 may use at least one of the same method 300 or the same method 700, the encoder module 114 and the decoder module 124 may generate the same reordered list for decreasing the number of bits in the bitstream.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data by an electronic device, the method comprising:
   receiving the video data;
   determining a block unit from a current frame according to the video data;
   determining at least one block vector predictor for the block unit;
   determining, from the current frame, a block template region adjacent to the block unit and determining, from the current frame, a plurality of candidate template regions, wherein:
     each of the plurality of candidate template regions is indicated by a specific one of the at least one block vector predictor and a corresponding one of a plurality of block vector differences, and
     the plurality of block vector differences is included in a vector difference list;
   determining a first cost value between the block template region and each of the plurality of candidate template regions;
   determining, based on the first cost values, an adjusted difference list of the block unit including at least one of the plurality of block vector differences; and
   selecting, based on the adjusted difference list, a reference block from the current frame for reconstructing the block unit.

2. The method according to claim 1, further comprising:
   determining, from the current frame, a plurality of block copy candidates;
   determining, from the current frame, a plurality of copy template regions, each adjacent to one of the plurality of block copy candidates;
   determining a second cost value between the block template region and each of the plurality of copy template regions; and
   selecting at least one merge block candidate from the plurality of block copy candidates based on the second cost values for determining the at least one block vector predictor.

3. The method according to claim 1, wherein:
   each of the at least one block vector predictor indicates a corresponding one of at least one intra block predictor from the block unit;
   a plurality of difference block candidates is indicated by the plurality of block vector differences and the specific one of the at least one block vector predictor; and
   each of the plurality of candidate template regions is adjacent to one of the plurality of difference block candidates.

4. The method according to claim 1, further comprising:
   determining an arrangement of the plurality of block vector differences based on the first cost values, wherein determining the adjusted difference list comprises determining the adjusted difference list based on the arrangement.

5. The method according to claim 4, wherein:
   a first K of the plurality of block vector differences ordered based on the arrangement are selected to be added to the adjusted difference list; and
   K, being an integer equal to or greater than one, is equal to a number of the at least one of the plurality of block vector differences included in the adjusted difference list and less than a number of the plurality of block vector differences.

6. The method according to claim 4, wherein the plurality of block vector differences is ordered in an ascending order of the first cost values to generate the arrangement.

7. The method according to claim 1, wherein:
   a specific one of the plurality of block vector differences is selected for the block unit, based on a prediction index included in the video data, from the adjusted difference list to reconstruct the block unit; and
   the block unit is reconstructed based on the specific one of the plurality of block vector differences and the specific one of the at least one block vector predictor without a fractional interpolation.

8. The method according to claim 1, wherein each of the plurality of block vector differences includes one of a plurality of vector difference directions and at least one of a plurality of vector difference magnitudes.

9. The method according to claim 8, wherein:
   the plurality of vector difference magnitudes is included in a predefined magnitude table and the plurality of vector difference directions is included in a predefined direction table, and
   the at least one of the plurality of vector difference magnitudes is selected from the predefined magnitude table based on at least one magnitude index included in the video data.

10. The method according to claim 1, wherein the specific one of the at least one block vector predictor is selected based on a predictor index included in the video data.

11. An electronic device for decoding video data, the electronic device comprising:
    one or more processors; and
    one or more non-transitory computer-readable media coupled to the one or more processors and storing one or more computer-executable instructions that, when executed by at least one of the one or more processors, cause the electronic device to:
      receive the video data;
      determine a block unit from a current frame according to the video data;
      determine at least one block vector predictor for the block unit;

determine, from the current frame, a block template region adjacent to the block unit and determine, from the current frame, a plurality of candidate template regions, wherein:
    each of the plurality of candidate template regions is indicated by a specific one of the at least one block vector predictor and a corresponding one of a plurality of block vector differences, and
    the plurality of block vector differences is included in a vector difference list;
determine a first cost value between the block template region and each of the plurality of candidate template regions;
determine, based on the first cost values, an adjusted difference list of the block unit including at least one of the plurality of block vector differences; and
selecting, based on the adjusted difference list, a reference block from the current frame for reconstructing the block unit.

12. The electronic device according to claim 11, wherein the one or more computer-executable instructions, when executed by the at least one of the one or more processors, further cause the electronic device to:
determine, from the current frame, a plurality of block copy candidates;
determine, from the current frame, a plurality of copy template regions, each adjacent to one of the plurality of block copy candidates;
determine a second cost value between the block template region and each of the plurality of copy template regions; and
select at least one merge block candidate from the plurality of block copy candidates based on the second cost values for determining the at least one block vector predictor.

13. The electronic device according to claim 11, wherein:
each of the at least one block vector predictor indicates a corresponding one of at least one intra block predictor from the block unit;
a plurality of difference block candidates is indicated by the plurality of block vector differences and the specific one of the at least one block vector predictor; and
each of the plurality of candidate template regions is adjacent to one of the plurality of difference block candidates.

14. The electronic device according to claim 11, wherein the one or more computer-executable instructions, when executed by the at least one of the one or more processors, further cause the electronic device to:
determine an arrangement of the plurality of block vector differences based on the first cost values, wherein
determining the adjusted difference list comprises determining the adjusted difference list based on the arrangement.

15. The electronic device according to claim 14, wherein:
a first K of the plurality of block vector differences ordered based on the arrangement are selected to be added to the adjusted difference list, and
K, being an integer equal to or greater than one, is equal to a number of the at least one of the plurality of block vector differences included in the adjusted difference list and less than a number of the plurality of block vector differences.

16. The electronic device according to claim 14, wherein the plurality of block vector differences is ordered in an ascending order of the first cost values to generate the arrangement.

17. The electronic device according to claim 11, wherein:
a specific one of the plurality of block vector differences is selected for the block unit, based on a prediction index included in the video data, from the adjusted difference list to reconstruct the block unit; and
the block unit is reconstructed based on the specific one of the plurality of block vector differences and the specific one of the at least one block vector predictor without a fractional interpolation.

18. The electronic device according to claim 11, wherein each of the plurality of block vector differences includes one of a plurality of vector difference directions and at least one of a plurality of vector difference magnitudes.

19. The electronic device according to claim 18, wherein:
the plurality of vector difference magnitudes is included in a predefined magnitude table and the plurality of vector difference directions is included in a predefined direction table, and
the at least one of the plurality of vector difference magnitudes is selected from the predefined magnitude table based on at least one magnitude index included in the video data.

20. The electronic device according to claim 11, wherein the specific one of the at least one block vector predictor is selected based on a predictor index included in the video data.

* * * * *